US012318904B2

(12) United States Patent
McCue et al.

(10) Patent No.: US 12,318,904 B2
(45) Date of Patent: Jun. 3, 2025

(54) POWERHEAD UNIT FOR TOOL

(71) Applicant: MILWAUKEE ELECTRIC TOOL CORPORATION, Brookfield, WI (US)

(72) Inventors: Shane McCue, Greenfield, WI (US); John L. Whealon, West Bend, WI (US); Kyle D. Korn, Wauwatosa, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 18/623,230

(22) Filed: Apr. 1, 2024

(65) Prior Publication Data
US 2024/0246216 A1 Jul. 25, 2024

Related U.S. Application Data

(60) Continuation of application No. 17/977,316, filed on Oct. 31, 2022, now Pat. No. 11,945,090, which is a
(Continued)

(51) Int. Cl.
*A01G 3/053* (2006.01)
*A01D 34/416* (2006.01)
(Continued)

(52) U.S. Cl.
CPC .................. *B25F 3/00* (2013.01); *B25F 5/02* (2013.01); *A01D 34/416* (2013.01); *A01G 3/053* (2013.01); *A01G 3/086* (2013.01)

(58) Field of Classification Search
CPC . B25F 3/00; B25F 5/02; A01D 34/416; A01D 2034/907; A01D 2034/6843; A01G 3/053; A01G 3/086
See application file for complete search history.

(56) References Cited

U.S. PATENT DOCUMENTS 2,932,144 A 4/1960 Garner, Sr. et al.
2,985,821 A 5/1961 Del
(Continued)

FOREIGN PATENT DOCUMENTS

CN 2565254 Y 8/2003
CN 201078912 Y 7/2008
(Continued)

*Primary Examiner* — Thomas M Wittenschlaeger
*Assistant Examiner* — David G Shutty
(74) *Attorney, Agent, or Firm* — Dority & Manning, P.A.

(57) ABSTRACT

An outdoor tool includes a powerhead unit and an attachment unit. The powerhead unit includes a motor, a housing assembly housing the motor and including a handle portion, and a first shaft segment supported within the housing assembly and extending along a shaft axis to a first connecting portion. The powerhead unit also includes a first driveshaft segment coupled to the motor and extending within the first shaft segment, a switch supported within the handle portion and operable to activate the motor, and a trigger assembly. The trigger assembly includes a trigger configured to selectively actuate the switch, a first lock-off member, and a second lock-off member. The attachment unit is selectively couplable to and powered by the powerhead unit. The attachment unit includes an operational unit configured to be driven by the motor, a second shaft segment, and a second connecting portion.

20 Claims, 31 Drawing Sheets

Related U.S. Application Data division of application No. 16/417,713, filed on May 21, 2019, now Pat. No. 11,485,003.

(60) Provisional application No. 62/675,661, filed on May 23, 2018.

(51) Int. Cl.
  *A01G 3/08* (2006.01)
  *B25F 3/00* (2006.01)
  *B25F 5/02* (2006.01)

(56) References Cited

U.S. PATENT DOCUMENTS

| | | | |
|---|---|---|---|
| 3,755,771 A | 8/1973 | Brush | |
| 3,881,081 A * | 4/1975 | Schilling | H01H 9/06 200/522 |
| 3,973,179 A | 8/1976 | Weber et al. | |
| 4,049,059 A | 9/1977 | Weibling | |
| 4,122,601 A | 10/1978 | Katsuya | |
| 4,397,088 A | 8/1983 | Hampel | |
| 4,463,498 A | 8/1984 | Everts | |
| 4,505,040 A | 3/1985 | Everts | |
| 4,550,967 A | 11/1985 | Riches et al. | |
| 4,575,356 A | 3/1986 | Murohushi et al. | |
| 4,641,640 A | 2/1987 | Griggs | |
| 4,642,837 A | 2/1987 | Nichols et al. | |
| 4,733,471 A | 3/1988 | Rahe | |
| 4,764,129 A | 8/1988 | Jones et al. | |
| 4,876,490 A | 10/1989 | Kolb | |
| 4,879,438 A * | 11/1989 | Winchester | H01H 9/06 310/50 |
| 4,882,897 A * | 11/1989 | Oshima | A01D 34/6806 56/11.3 |
| 5,065,476 A * | 11/1991 | Dohse | B24B 23/00 451/340 |
| 5,288,161 A | 2/1994 | Graves et al. | |
| 5,360,451 A | 11/1994 | Keller | |
| 5,518,109 A | 5/1996 | Dailey et al. | |
| 5,577,600 A * | 11/1996 | Schoene | H01H 3/20 200/321 |
| 5,594,990 A | 1/1997 | Brant et al. | |
| 5,603,173 A | 2/1997 | Brazell | |
| 5,802,724 A | 9/1998 | Rickard et al. | |
| 5,809,653 A | 9/1998 | Everts et al. | |
| 5,819,418 A | 10/1998 | Uhl | |
| 5,926,961 A | 7/1999 | Uhl | |
| 5,969,312 A * | 10/1999 | Svetlik | H01H 3/20 83/DIG. 1 |
| 6,006,434 A * | 12/1999 | Templeton | A01D 34/90 30/296.1 |
| 6,082,083 A * | 7/2000 | Stalpes | A01D 34/6806 56/11.1 |
| 6,171,125 B1 | 1/2001 | Kirkendall | |
| 6,286,852 B1 | 9/2001 | Slatten | |
| 6,305,867 B1 | 10/2001 | Schweigert et al. | |
| 6,402,565 B1 | 6/2002 | Pooley et al. | |
| 6,938,587 B2 | 9/2005 | Thomas et al. | |
| 6,997,633 B2 | 2/2006 | Thomas et al. | |
| 7,131,499 B2 * | 11/2006 | Breneman | A01D 34/90 172/14 |
| 7,186,940 B1 * | 3/2007 | Wong | H01H 1/2016 200/522 |
| 7,291,796 B2 * | 11/2007 | Liu | H01H 1/2025 200/341 |
| 7,293,934 B1 | 11/2007 | Huang | |
| 7,314,096 B2 | 1/2008 | Shaffer et al. | |
| 7,484,300 B2 | 2/2009 | King et al. | |
| 7,666,028 B2 | 2/2010 | Meleck | |
| 7,686,659 B2 | 3/2010 | Peng | |
| 7,823,652 B2 * | 11/2010 | Nemcek | A01D 34/90 173/1 |
| 8,136,254 B2 | 3/2012 | Gieske et al. | |
| 8,156,656 B2 * | 4/2012 | Tate | A01G 3/053 16/110.1 |
| 8,198,560 B2 * | 6/2012 | Kimata | H01H 9/28 200/318.1 |
| 8,506,198 B2 | 8/2013 | West et al. | |
| 8,608,118 B2 | 12/2013 | Lai | |
| 8,695,223 B2 | 4/2014 | Ito | |
| 9,009,921 B1 | 4/2015 | Ramsey et al. | |
| 9,333,636 B2 | 5/2016 | Yamada et al. | |
| 9,414,540 B2 * | 8/2016 | Morabit | A01D 34/902 |
| 9,417,651 B2 * | 8/2016 | Goetzel | F02B 63/02 |
| 9,591,809 B2 | 3/2017 | Gieske et al. | |
| 9,893,384 B2 | 2/2018 | Velderman et al. | |
| 9,897,135 B2 | 2/2018 | Miyakawa | |
| 9,955,627 B2 * | 5/2018 | Nakano | A01G 3/062 |
| 10,279,461 B2 | 5/2019 | Miaowu et al. | |
| 10,638,666 B2 | 5/2020 | Fu | |
| 11,248,638 B2 | 2/2022 | Ivan | |
| 2005/0205406 A1 * | 9/2005 | Wong | H01H 9/06 200/522 |
| 2005/0271463 A1 | 12/2005 | Mann | |
| 2007/0000138 A1 | 1/2007 | Baskar et al. | |
| 2008/0141541 A1 * | 6/2008 | Hurley | A01D 34/4163 83/13 |
| 2008/0184568 A1 | 8/2008 | Gieske et al. | |
| 2008/0250570 A1 | 10/2008 | Dayton et al. | |
| 2010/0038106 A1 | 2/2010 | Nemcek et al. | |
| 2010/0054853 A1 | 3/2010 | Jesse | |
| 2010/0058726 A1 | 3/2010 | Notaras et al. | |
| 2010/0281697 A1 | 11/2010 | Tate et al. | |
| 2013/0075122 A1 | 3/2013 | Yamada et al. | |
| 2013/0142563 A1 | 6/2013 | Sumi et al. | |
| 2013/0277189 A1 * | 10/2013 | Yuan | H01H 3/20 200/332 |
| 2014/0054055 A1 | 2/2014 | Yaschur et al. | |
| 2014/0208598 A1 | 7/2014 | Morita et al. | |
| 2014/0208599 A1 | 7/2014 | Nagahama | |
| 2014/0349556 A1 * | 11/2014 | Zhang | B25F 5/02 451/359 |
| 2014/0352160 A1 * | 12/2014 | Ifuku | A01D 34/90 30/276 |
| 2016/0088792 A1 * | 3/2016 | Yamaoka | A01D 34/81 30/276 |
| 2016/0227694 A1 | 8/2016 | Bermudez | |
| 2016/0265247 A1 | 9/2016 | Clifford et al. | |
| 2016/0345492 A1 * | 12/2016 | Miller | A01D 34/416 |
| 2016/0375571 A1 | 12/2016 | Gieske et al. | |
| 2017/0232601 A1 | 8/2017 | Gieske et al. | |
| 2019/0198270 A1 * | 6/2019 | Wong | H01H 19/635 |
| 2023/0047350 A1 | 2/2023 | McCue et al. | |
| 2024/0246216 A1 * | 7/2024 | McCue | B25F 5/02 |

FOREIGN PATENT DOCUMENTS

| | | |
|---|---|---|
| CN | 202425365 U | 9/2012 |
| CN | 202587909 U | 12/2012 |
| CN | 202759859 U | 3/2013 |
| CN | 103535201 A | 1/2014 |
| CN | 203467282 U | 3/2014 |
| CN | 204104399 U | 1/2015 |
| CN | 104339328 A | 2/2015 |
| CN | 103535202 B | 9/2015 |
| CN | 105850530 A | 8/2016 |
| CN | 105993639 A | 10/2016 |
| DE | 8634082 U1 | 1/1989 |
| EP | 2407021 A1 | 1/2012 |

* cited by examiner

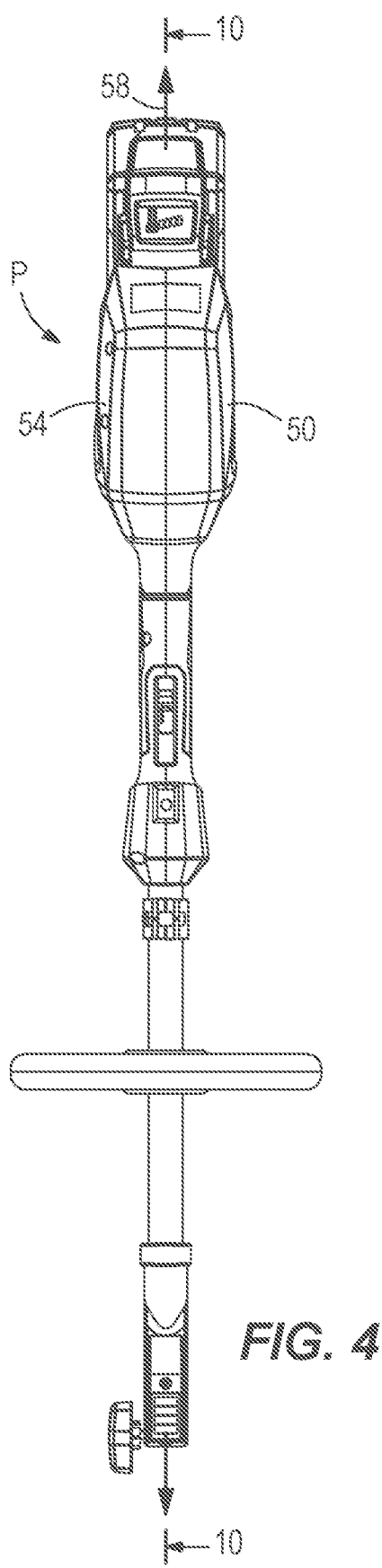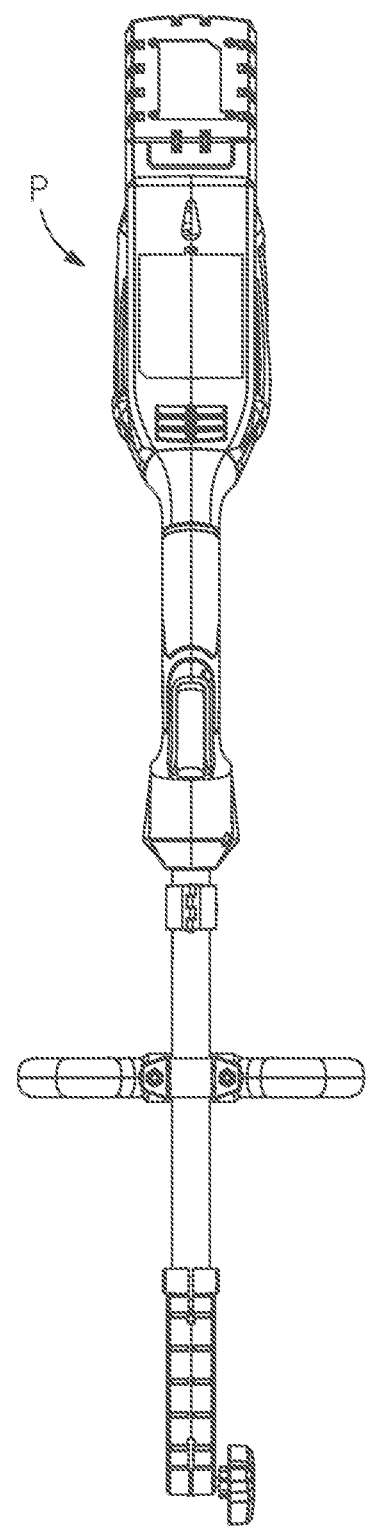
FIG. 4
FIG. 5

POWERHEAD UNIT FOR TOOL

CROSS-REFERENCE TO RELATED APPLICATIONS

This application is a continuation of U.S. patent application Ser. No. 17/977,316, filed on Oct. 31, 2022, now U.S. Pat. No. 11,945,090, which is a divisional of U.S. patent application Ser. No. 16/417,713, filed on May 21, 2019, now U.S. Pat. No. 11,485,003, which claims priority to U.S. Provisional Patent Application No. 62/675,661, filed on May 23, 2018, the entire contents of each of which is incorporated herein by reference.

FIELD OF THE INVENTION

The invention generally relates to powered devices, and, more particularly, to a powerhead unit for a tool, such as an outdoor tool or power tool.

BACKGROUND OF THE INVENTION

Powered devices, such as outdoor tools (e.g., a trimmer, an edger, a pole saw, etc.), power tools, etc., may include an elongated shaft assembly extending between a powerhead unit and a powered attachment unit. The shaft assembly may include a number of separate shaft segments, which can be coupled and decoupled, for example, for shipping, storage, exchange of attachment units, etc.

SUMMARY OF THE INVENTION

In some aspects, the techniques described herein relate to an outdoor tool including: a powerhead unit including a motor, a housing assembly housing the motor and including a handle portion, a first shaft segment supported within the housing assembly and extending along a shaft axis to a first connecting portion, a first driveshaft segment coupled to the motor and extending within the first shaft segment, a switch supported within the handle portion and operable to activate the motor, and a trigger assembly including a trigger configured to selectively actuate the switch, a first lock-off member movable between a first position preventing the trigger from actuating the switch, and a second position permitting the trigger to actuate the switch, and a second lock-off member movable between a locked position preventing the first lock-off member from moving to the second position, and an unlocked position permitting first lock-off member to move to the second position; and an attachment unit selectively couplable to and powered by the powerhead unit, the attachment unit including an operational unit configured to be driven by the motor, a second shaft segment having a second driveshaft segment operatively coupled to the operational unit, and a second connecting portion attached to the second shaft segment, the second connecting portion configured for coupling to the first connecting portion.

In some aspects, the techniques described herein relate to a powerhead unit for an outdoor tool, the outdoor tool further including an attachment unit selectively engageable with the powerhead unit and having an operational unit configured to be driven by the powerhead unit, the powerhead unit including: a motor; a housing assembly housing the motor and including a handle portion; a first shaft segment supported within the housing assembly and extending along a shaft axis to a first connecting portion; a first driveshaft segment coupled to the motor and extending within the first shaft segment; a switch supported within the handle portion and operable to activate the motor; and a trigger assembly including a trigger configured to selectively actuate the switch, a first lock-off member movable between a first position preventing the trigger from actuating the switch, and a second position permitting the trigger to actuate the switch, and a second lock-off member movable between a locked position preventing the first lock-off member from moving to the second position, and an unlocked position permitting first lock-off member to move to the second position.

In some aspects, the techniques described herein relate to an outdoor tool including: a powerhead unit including a housing assembly including a handle portion and a battery attachment portion configured to selectively connect to a battery pack, a first shaft segment supported within the housing assembly and extending along a shaft axis to a first connecting portion, a switch supported within the handle portion, and a trigger assembly including a trigger configured to selectively actuate the switch, a first lock-off member movable between a first position preventing the trigger from actuating the switch, and a second position permitting the trigger to actuate the switch, and a second lock-off member supported on the first lock-off member, the second lock-off member being movable between a locked position preventing the first lock-off member from moving to the second position, and an unlocked position permitting first lock-off member to move to the second position; and an attachment unit selectively couplable to and powered by the powerhead unit, the attachment unit including a second shaft segment, an operational unit coupled to a first end of the second shaft segment, and a second connecting portion coupled to a second end of the second shaft segment, the second connecting portion configured for coupling to the first connecting portion.

Other independent aspects of the invention may become apparent by consideration of the detailed description and accompanying drawings.

BRIEF DESCRIPTION OF THE DRAWINGS

FIG. 4 is a top view of the powerhead unit of FIG. 1.
FIG. 5 is a bottom view of the powerhead unit of FIG. 1.

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways. Also, it is to be understood that the phraseology and terminology used herein is for the purpose of description and should not be regarded as limiting.

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

DETAILED DESCRIPTION

Figure 1:
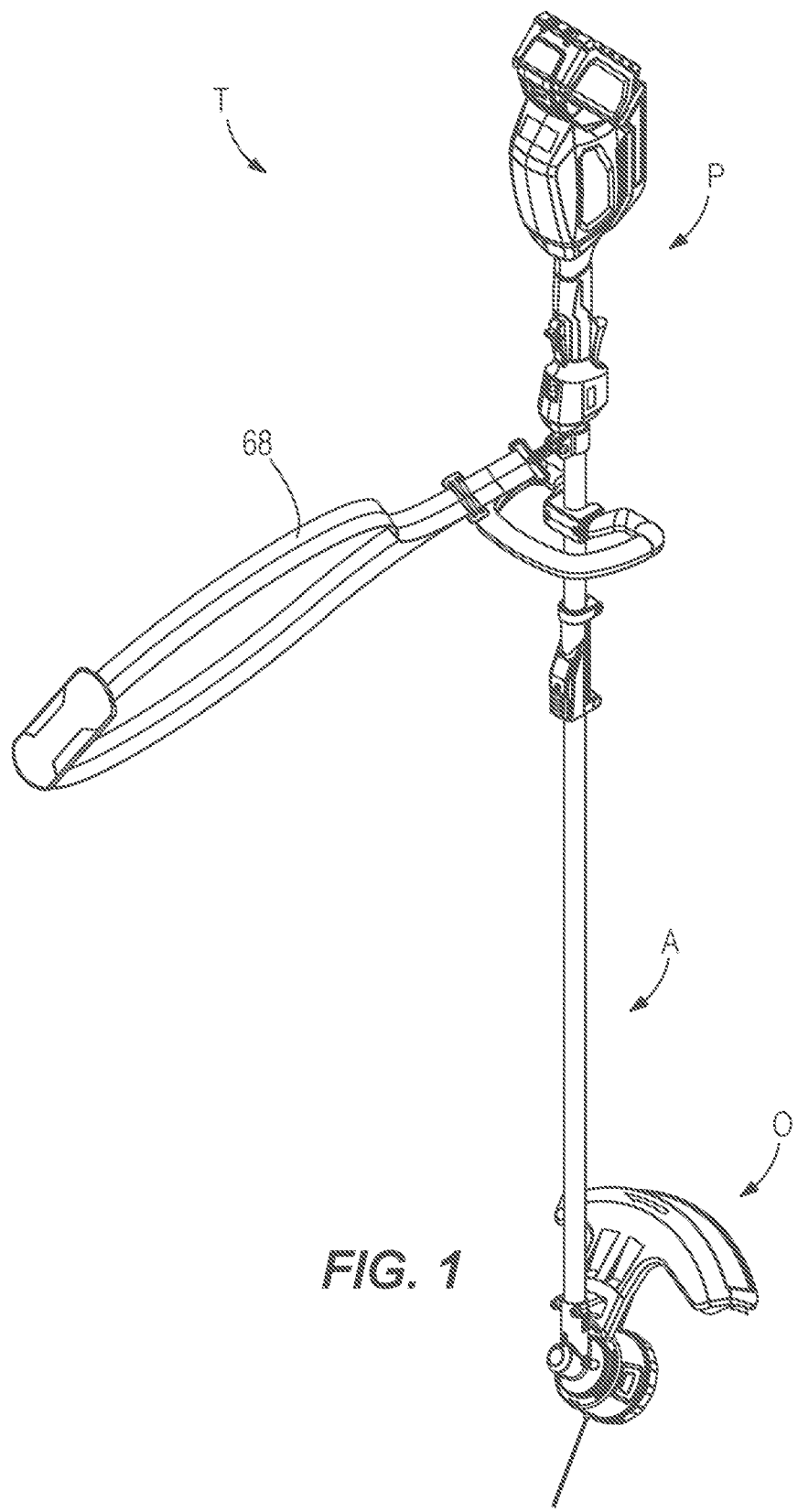
FIG. 1 is a perspective view of a powered device, such as an outdoor tool, a power tool, etc., including a powerhead unit and an attachment unit.
Figure 2A:
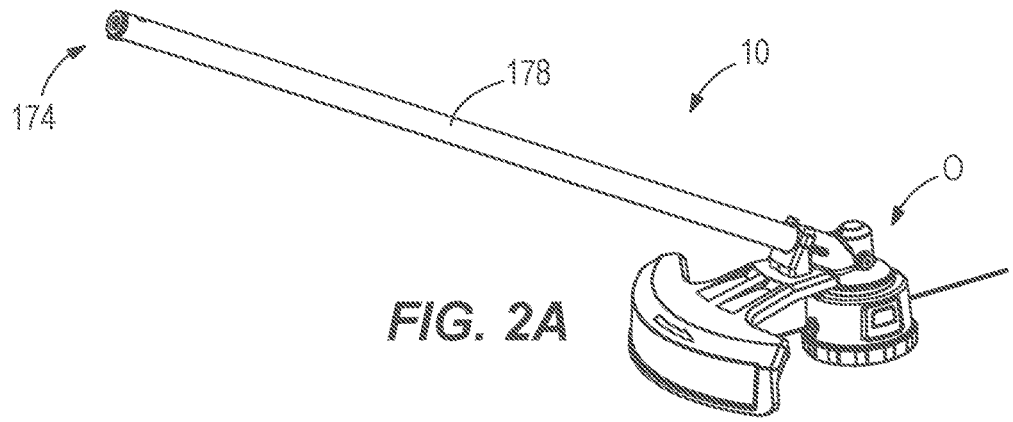
FIG. 2A is a perspective view of the attachment unit of FIG. 1 including a string trimmer attachment for use with the powerhead unit.
Figure 2B:
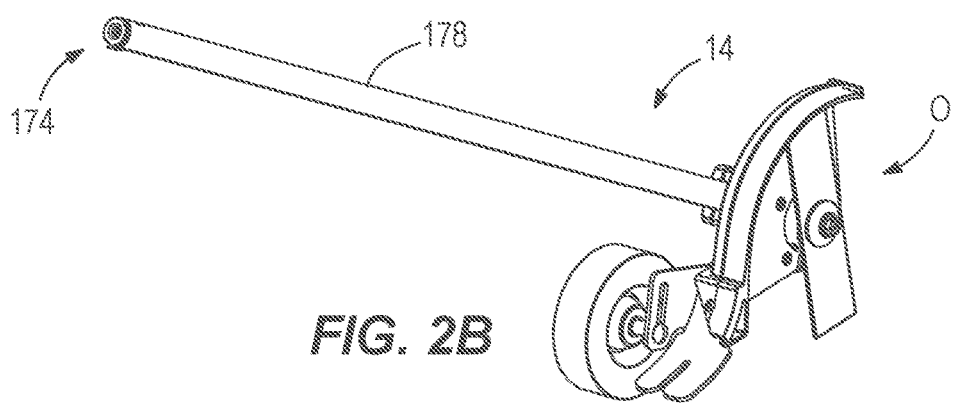
FIG. 2B is a perspective view of an alternative attachment unit including an edger attachment for use with the powerhead unit of FIG. 1.
Figure 2C:
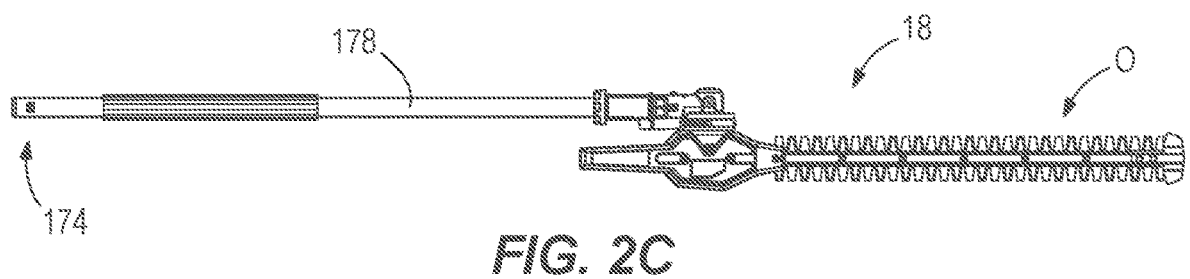
FIG. 2C is a side view of another alternative attachment unit including a hedge trimmer attachment for use with the powerhead unit of FIG. 1.
Figure 2D:
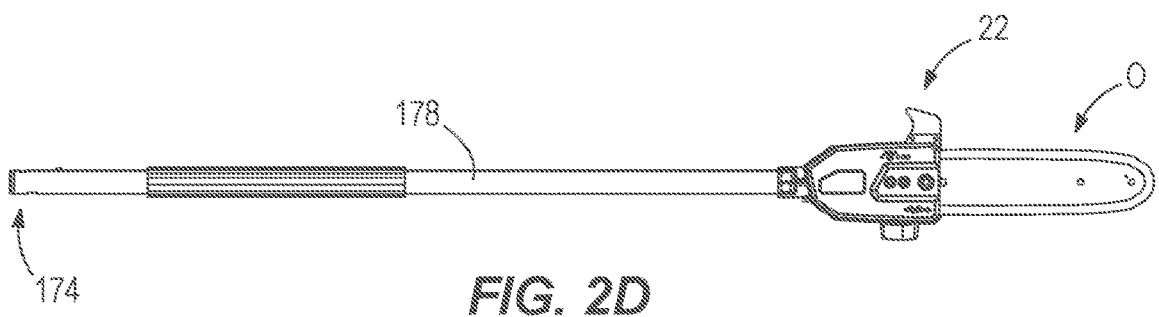
FIG. 2D is a side view of yet another alternative attachment unit including a pole saw attachment for use with the powerhead unit of FIG. 1.
Figure 3:
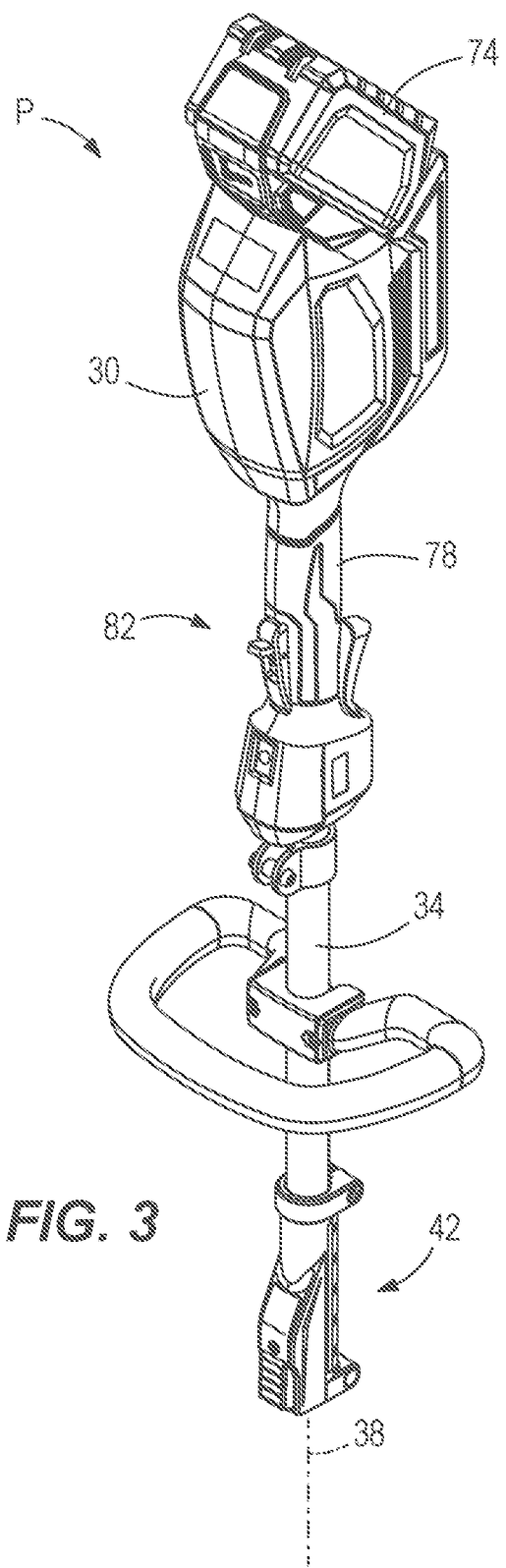
FIG. 3 is a perspective view of the powerhead unit of FIG. 1.
Figure 6:
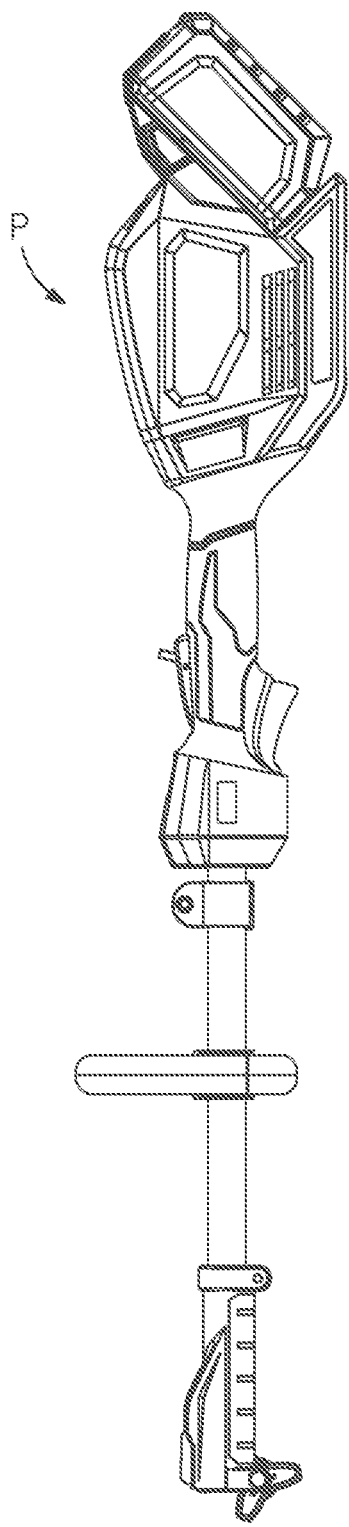
FIG. 6 is a side view of the powerhead unit of FIG. 1.
Figure 7:
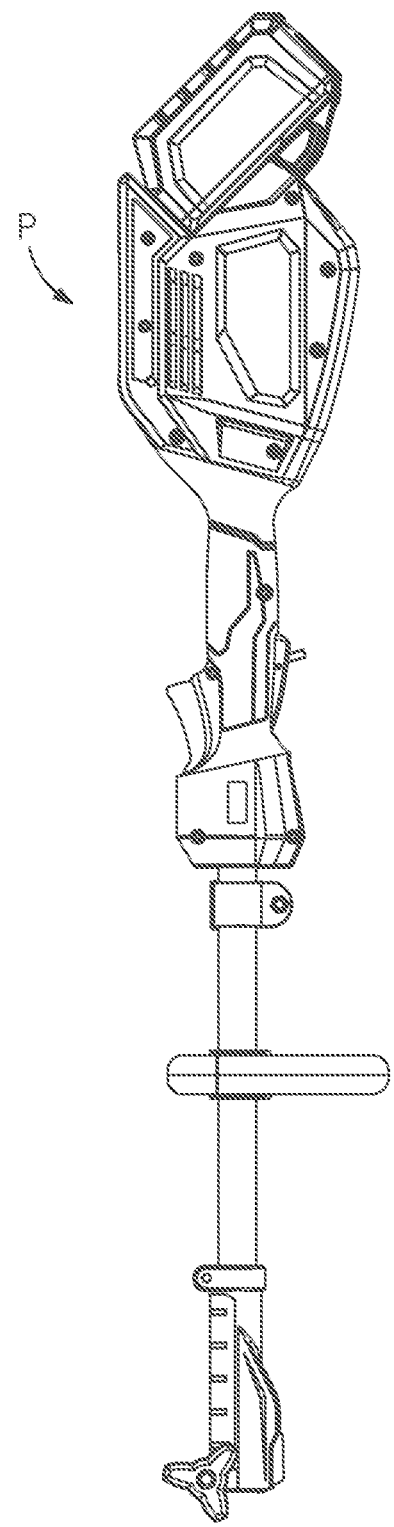
FIG. 7 is another side view of the powerhead unit of FIG. 1.
Figure 8:
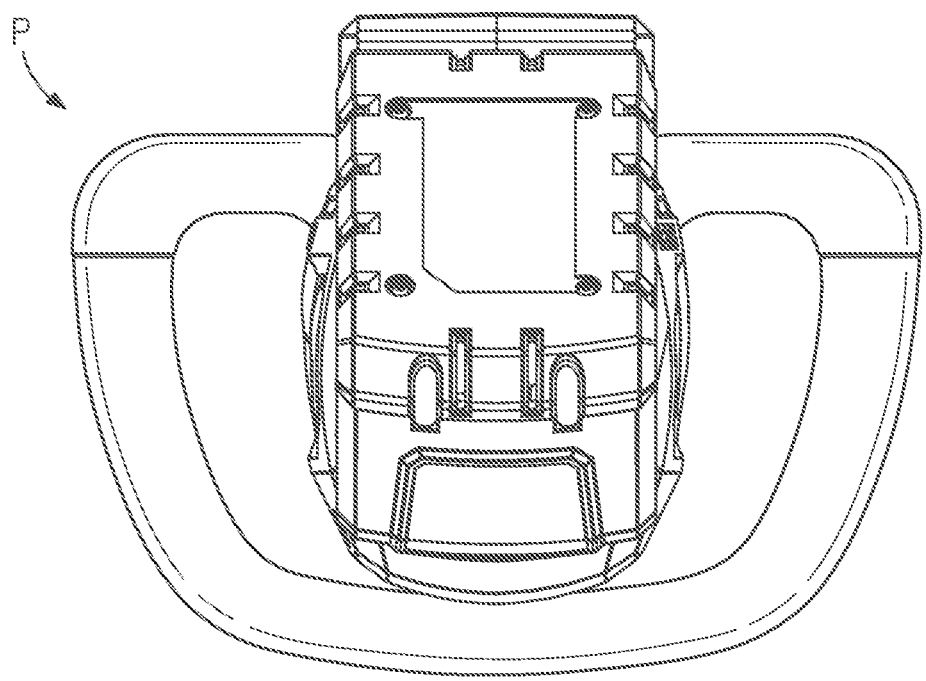
FIG. 8 is an end view of the powerhead unit of FIG. 1.
Figure 9:
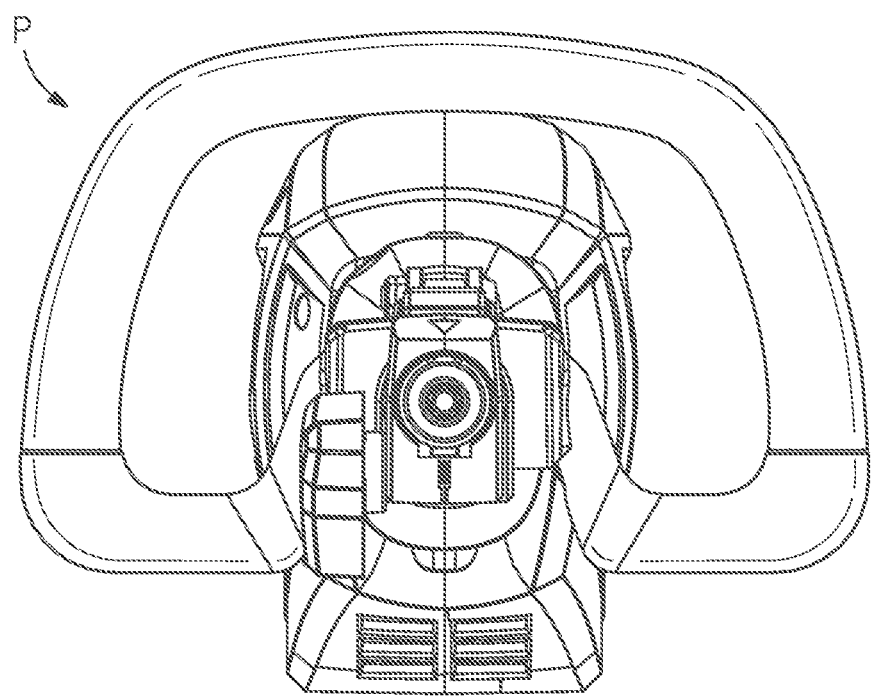
FIG. 9 is another end view of the powerhead unit of FIG. 1.

FIG. 1 illustrates a powered device, such as an outdoor tool T, a power tool, etc., including a powerhead unit P and an attachment unit A selectively and removably coupled to the powerhead unit P. As shown in FIG. 1, the illustrated attachment unit A includes a string trimmer attachment 10 (see FIG. 2A). In other constructions, such as those illustrated in FIGS. 2B-2D, the attachment unit A may include an edger attachment 14, a hedge trimmer attachment 18, and a pole saw attachment 22. In further constructions (not shown), the attachment unit A may include another tool attachment (e.g., a blower attachment, a cultivator attachment, a saw attachment, a drill attachment, etc.). The powerhead unit P and the various attachment units 10, 14, 18, 22, etc., form a family of powered devices.

A similar hedge trimmer attachment is described and illustrated in U.S. Provisional Patent Application No. 62/675,662, filed May 23, 2018, entitled "HEDGE TRIMMER", and in corresponding U.S. patent application Ser. No. 16/417,715, filed May 21, 2019, entitled "HEDGE TRIMMER". A similar pole trimmer attachment is described and illustrated in U.S. Provisional Patent Application No.

62/675,663, filed May 23, 2018, entitled "POLE SAW", and in corresponding U.S. patent application Ser. No. 16/417,716, filed May 21, 2019, entitled "POLE SAW". The entire contents of these applications is hereby incorporated by reference.

FIGS. 3-31 illustrate the powerhead unit P in more detail. The powerhead unit P includes a powerhead 30 and a first shaft segment 34 extending along a shaft axis 38 between the powerhead 30 and a first connecting portion 42. The powerhead 30 includes a housing assembly 46 formed, in the illustrated construction, of two clamshell housing halves 50, 54 connected along a plane 58 (FIG. 4). Together, the housing halves 50, 54 define a compartment C (FIG. 10) containing a motor 62 and other internal components 66 of the powerhead 30. A support strap 68 is selectively coupled to the powerhead unit P to support the outdoor tool T.

The housing assembly 46 includes a battery attachment portion 70 (FIG. 12) configured to selectively mechanically and electrically connect to a rechargeable battery pack 74. The housing assembly 46 also includes a handle 78 (FIG. 3) supporting a trigger assembly 82 operable to selectively electrically connect the power source (e.g., the battery pack 74) and the motor 62.

Figure 10:
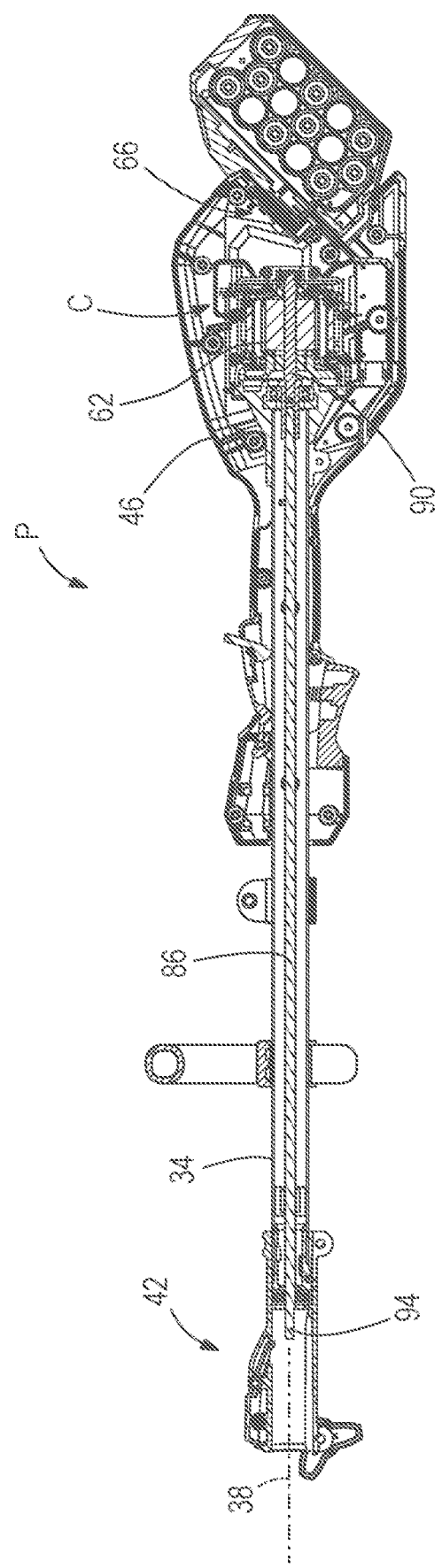
FIG. 10 is a cross-sectional view of the powerhead unit of FIG. 1, taken along line 10-10 of FIG. 4.
Figure 11:
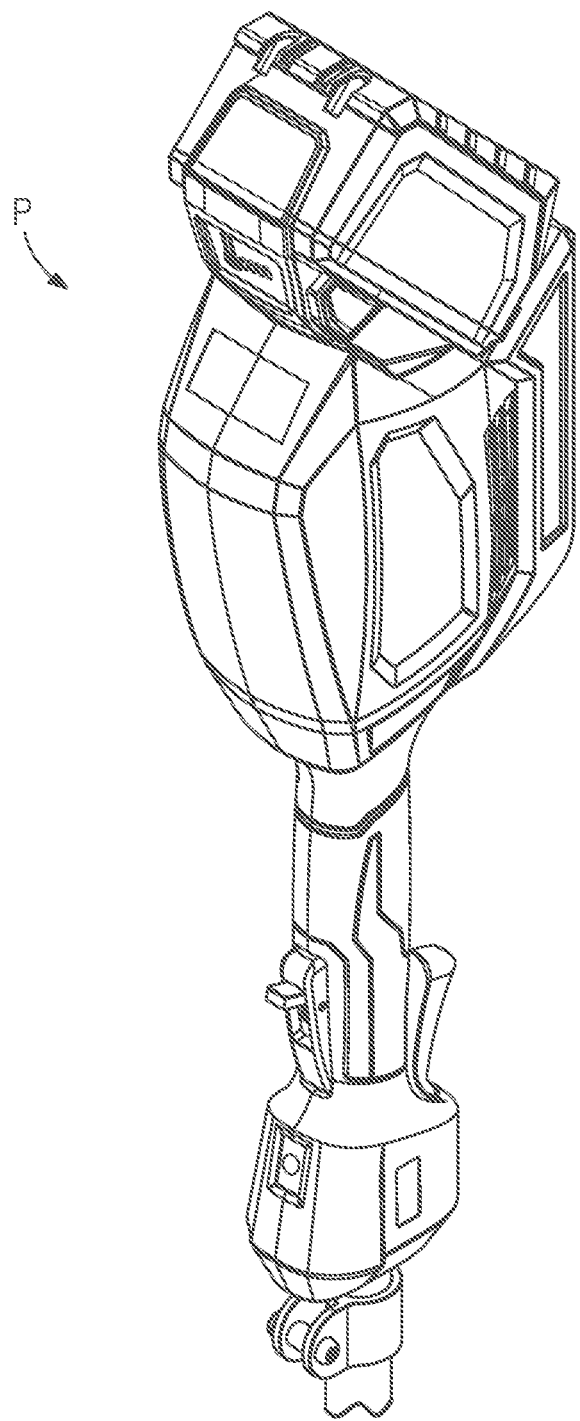
FIG. 11 is a perspective view of the powerhead of FIG. 3.
Figure 12:
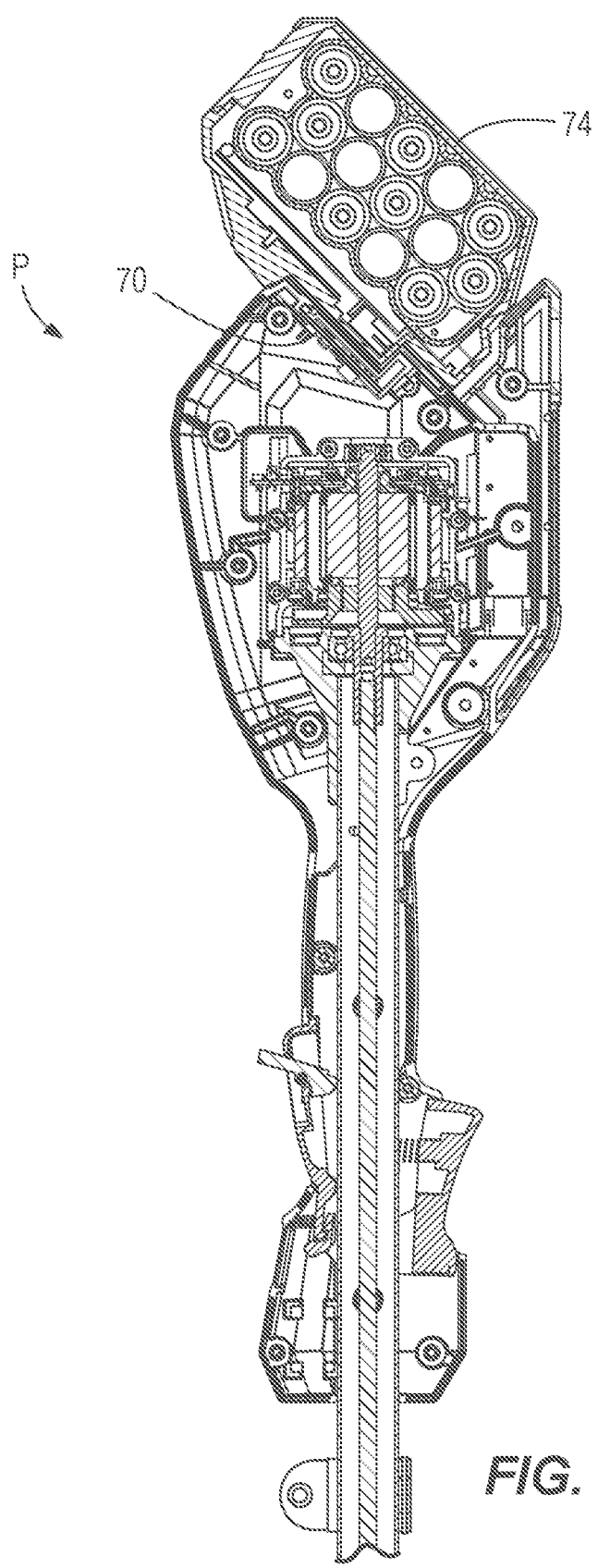
FIG. 12 is a cross-sectional side view of the powerhead of FIG. 3, taken generally along line 10-10 of FIG. 4.

With reference to FIG. 10, a first driveshaft segment 86 extends along the shaft axis 38 and within the first shaft segment 34 between the motor 62 and the first connecting portion 42. In the illustrated construction, the first driveshaft segment 86 is drivingly coupled at one end to a motor output shaft 90 and terminates at the other end in a male connection member 94 (e.g., a spline) within the first connecting portion 42.

Figure 13:
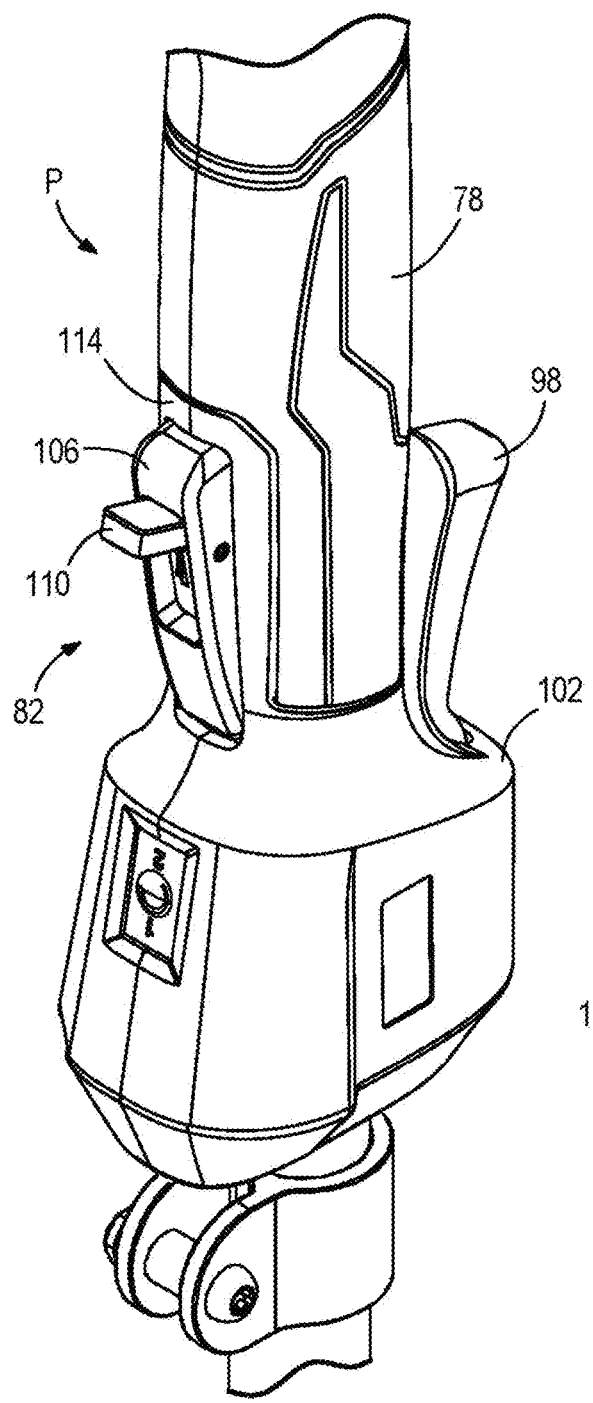
FIG. 13 is a perspective view of a portion of the powerhead unit of FIG. 11.
Figure 14:
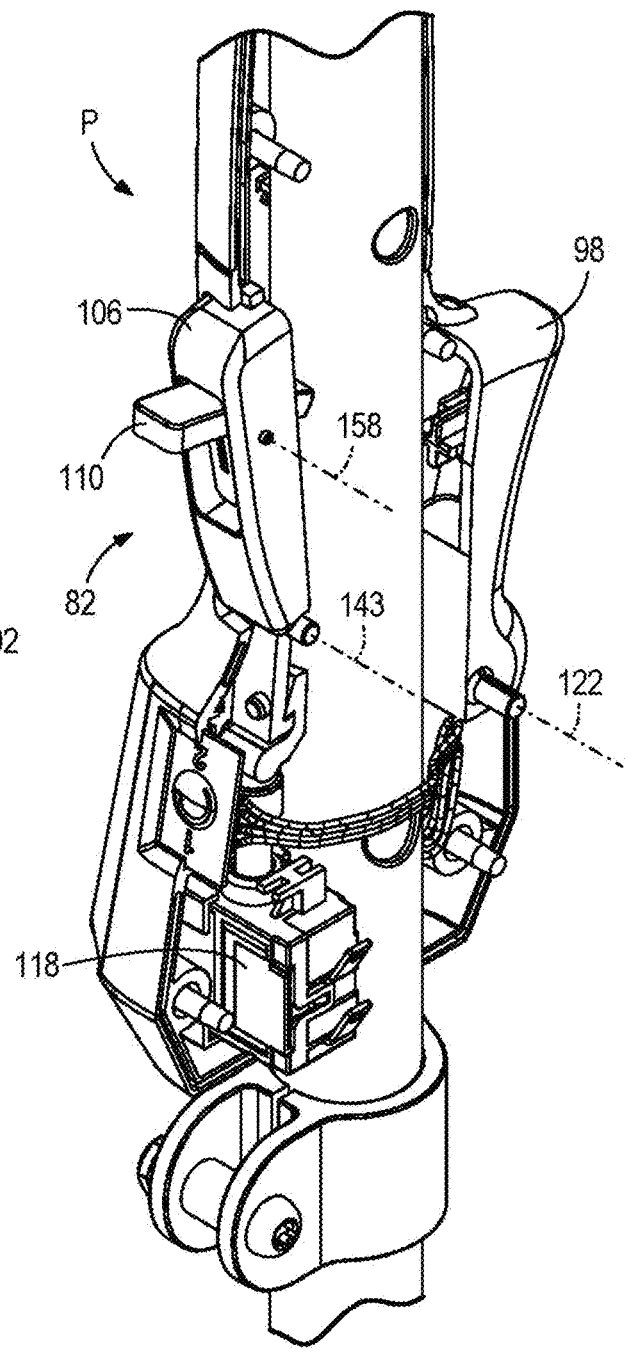
FIG. 14 is another perspective view of the portion of the powerhead unit of FIG. 11, with a housing portion removed.
Figure 15:
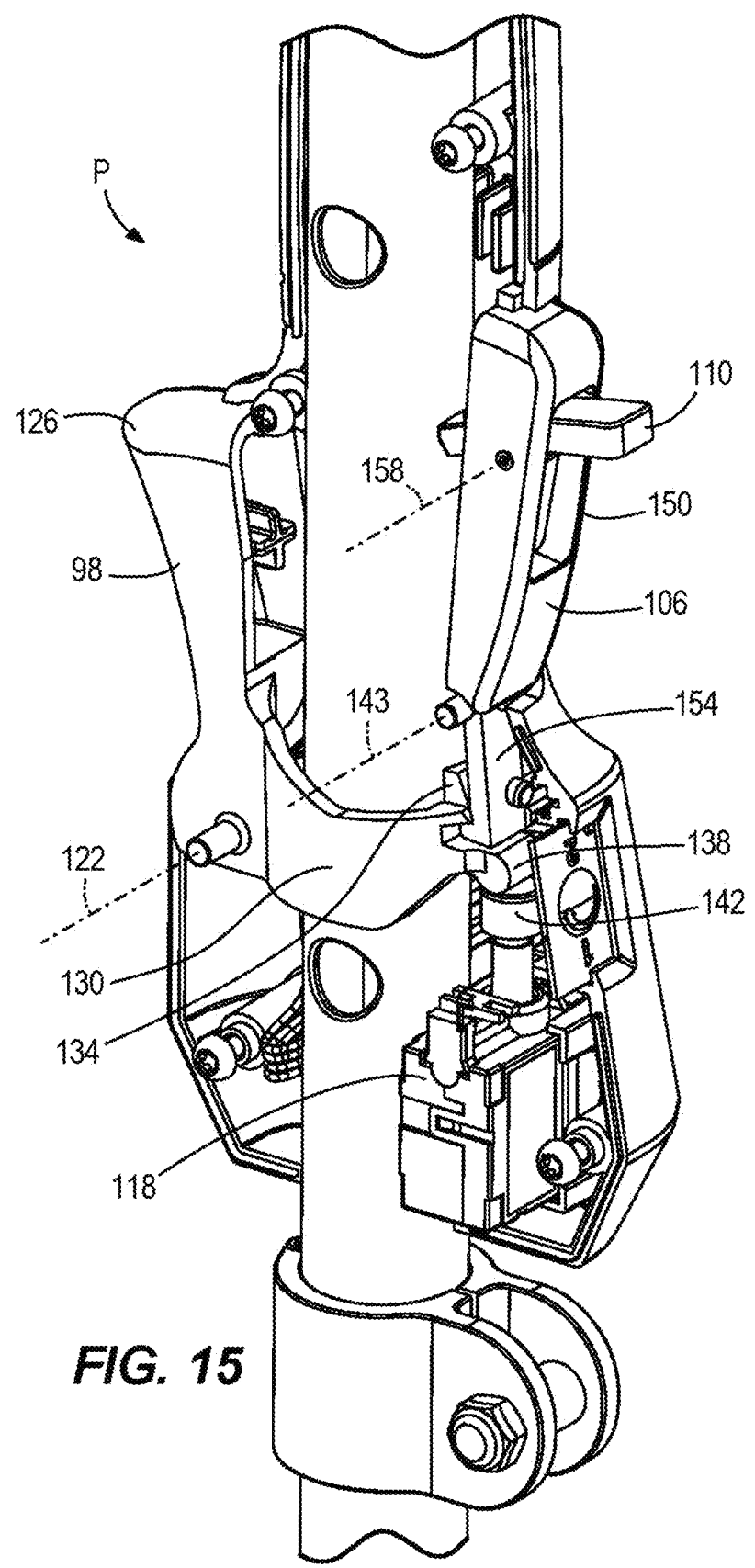
FIG. 15 is another perspective view of the portion of the powerhead unit of FIG. 11, with the other housing portion removed.

With reference to FIG. 13, in the illustrated construction, the trigger assembly 82 includes a "2-motion" trigger assembly with a trigger member 98 on one side 102 of the handle 78 and a lock-off assembly (e.g., a first lock-off member (a shark fin) 106 and a second lock-off member 110) on an opposite side 114 of the handle 78. The trigger 98 is operable to actuate a microswitch 118 (FIG. 14) to selectively activate and deactivate the motor 62 during operation of the outdoor tool T. The lock-off assembly prevents operation of the trigger 98. The second lock-off member 110 is supported by the first lock-off member and pivotable to selectively lock and unlock the first lock-off member 106.

With reference to FIGS. 14-19, the trigger 98 is pivotable about a trigger axis 122 (FIG. 14) between an un-operated or extended position (an "OFF" position of the microswitch 118) and an operated or depressed position (an "ON" position of the microswitch 118). In the illustrated construction, the trigger 106 includes an actuating portion 126 protruding from the handle 78, an arm portion 130 (FIG. 15) partially extending around one side of the first shaft segment 34, a first hook 134, and a first protrusion 138 operable to selectively engage a plunger 142 of the microswitch 118.

The first lock-off member 106 is pivotable about a first member pivot axis 143 (FIG. 14) between extended and depressed positions. The first lock-off member 106 includes an operating portion 150 protruding from the handle 78, and a second hook 154 selectively engageable with the first hook 134 of the trigger 98 to prevent the trigger 98 from being actuated when the first lock-off member 106 is in its extended position.

Figure 16:
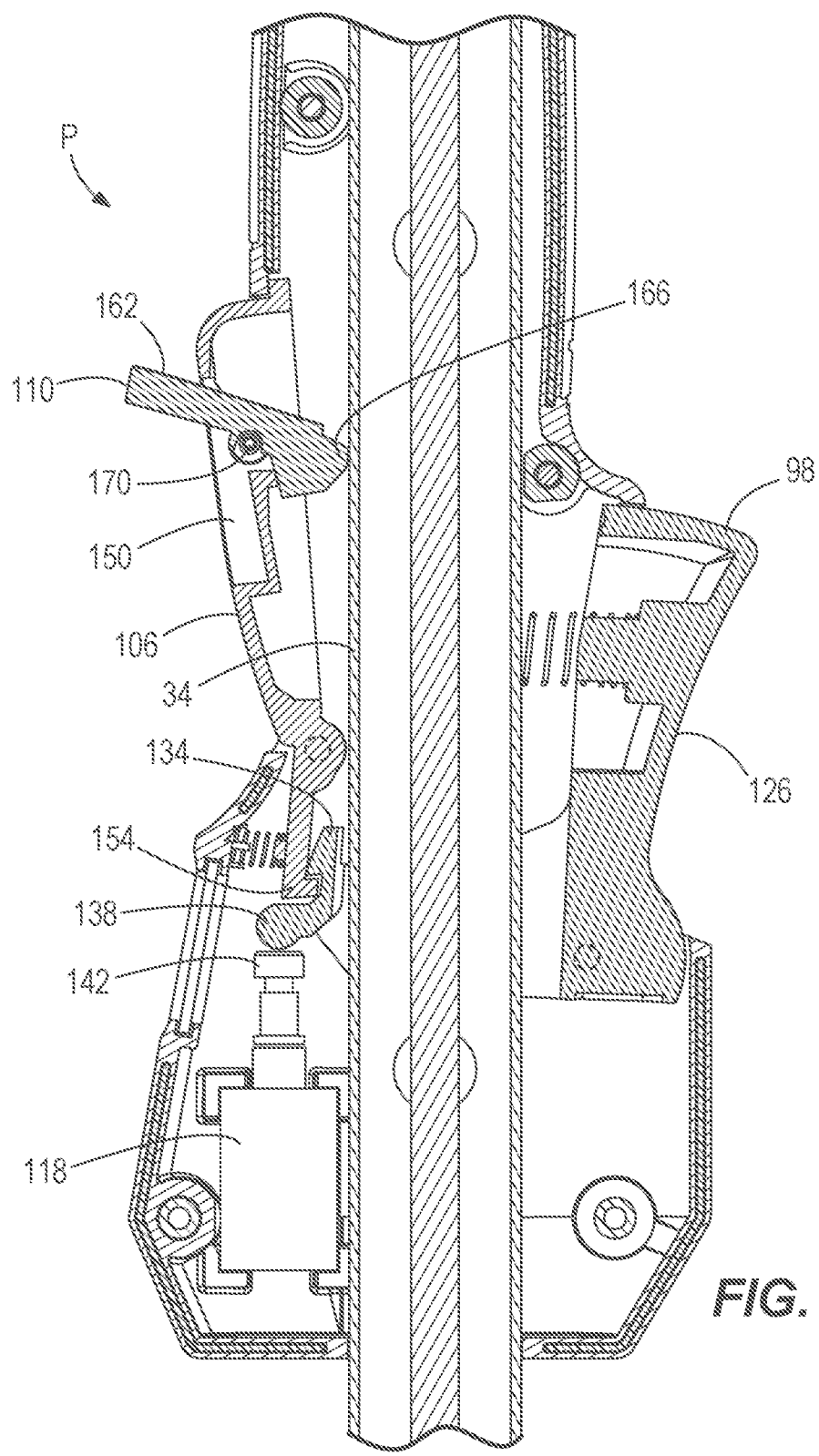
FIG. 16 is a cross-sectional side view of the portion of the powerhead unit of FIG. 11, taken generally along line 10-10 of FIG. 4.
Figure 17:
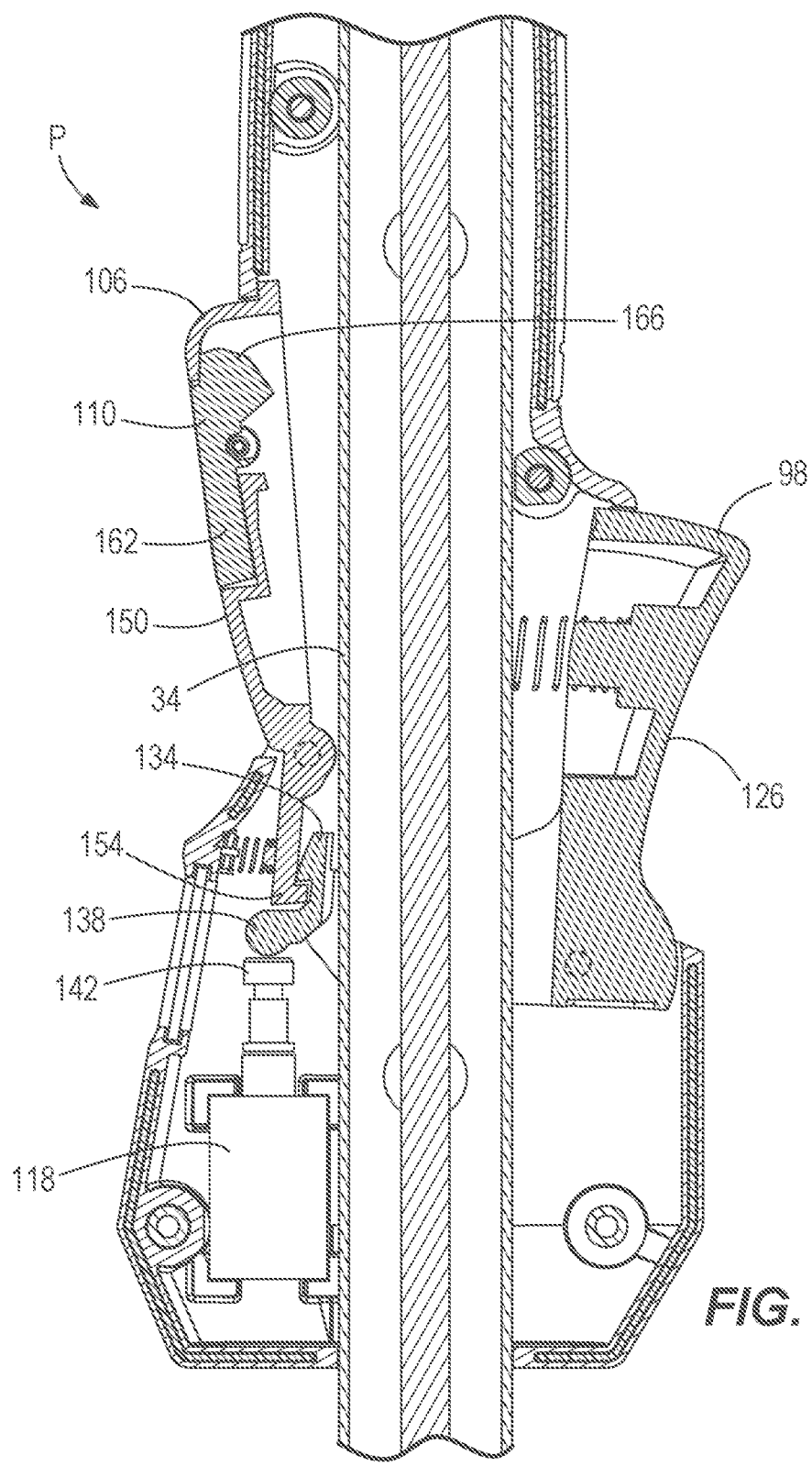
FIG. 17 is a cross-sectional view of the portion of the powerhead unit as shown in FIG. 16, illustrating a trigger element in a pivoted position.

The second lock-off member 110 is pivotable about a second member axis 158 (FIG. 14) between a locked position and an unlocked position. The second lock-off member 110 includes a tab 162 and a shoulder 166 (FIG. 16). In the locked position, the shoulder 166 abuts the first shaft segment 34 to lock the first lock-off member 106 in its extended position (FIG. 16) to thereby prevent operation of the trigger 98 and the microswitch 118.

Biasing members (not shown) bias each of the trigger 98 and the first lock-off member 106 toward their respective extended positions. In the illustrated construction, a torsion spring 170 biases the second lock-off member 110 toward the locking position.

With reference to FIGS. 16-19, the trigger assembly 82 is actuated to connect the power source and the motor 62 to activate the motor 62. First, the second lock-off member 110 is pivoted from the locked position (FIG. 16) to the unlocked position (FIG. 17) by pressing the tab 162 toward the first shaft segment 34, so that the shoulder 166 pivots away from the first shaft segment 34.

With the second lock-off member 110 in the unlocked position (FIG. 17), the first lock-off member 106 may be actuated from the extended position (FIG. 17) to the depressed position (FIG. 18), thereby disengaging the second hook 154 from the first hook 134 of the trigger 98. The trigger 98 may then be actuated from an extended position (FIG. 18) to a depressed position (FIG. 19), so that the first protrusion 138 pivots about the trigger axis 122 to engage and depress the plunger 142, and thereby electrically connect the power source and the motor 62 to activate the motor 62.

Figure 18:
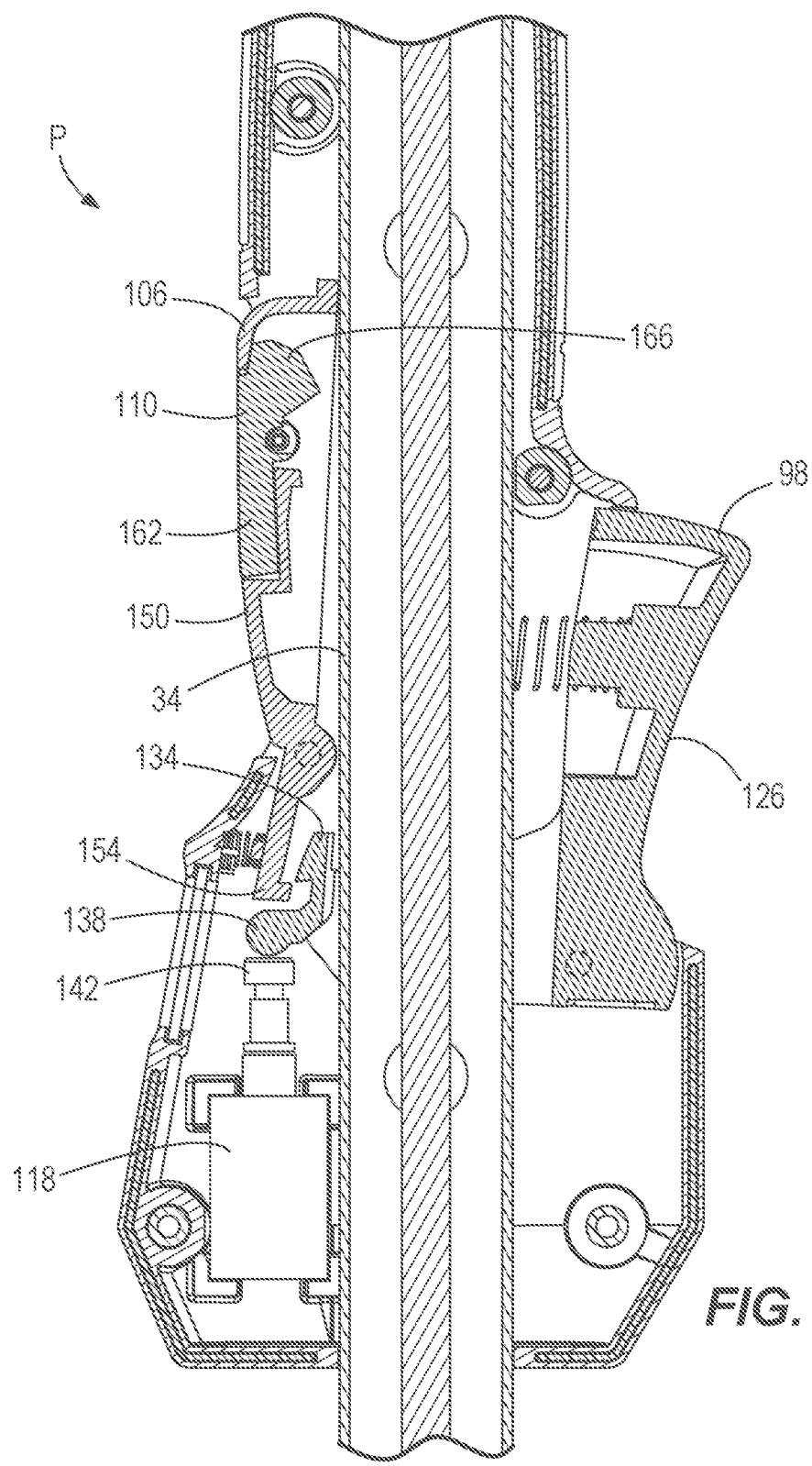
FIG. 18 is a cross-sectional view of the portion of the powerhead unit as shown in FIG. 16, illustrating another trigger element in a pivoted position.
Figure 19:
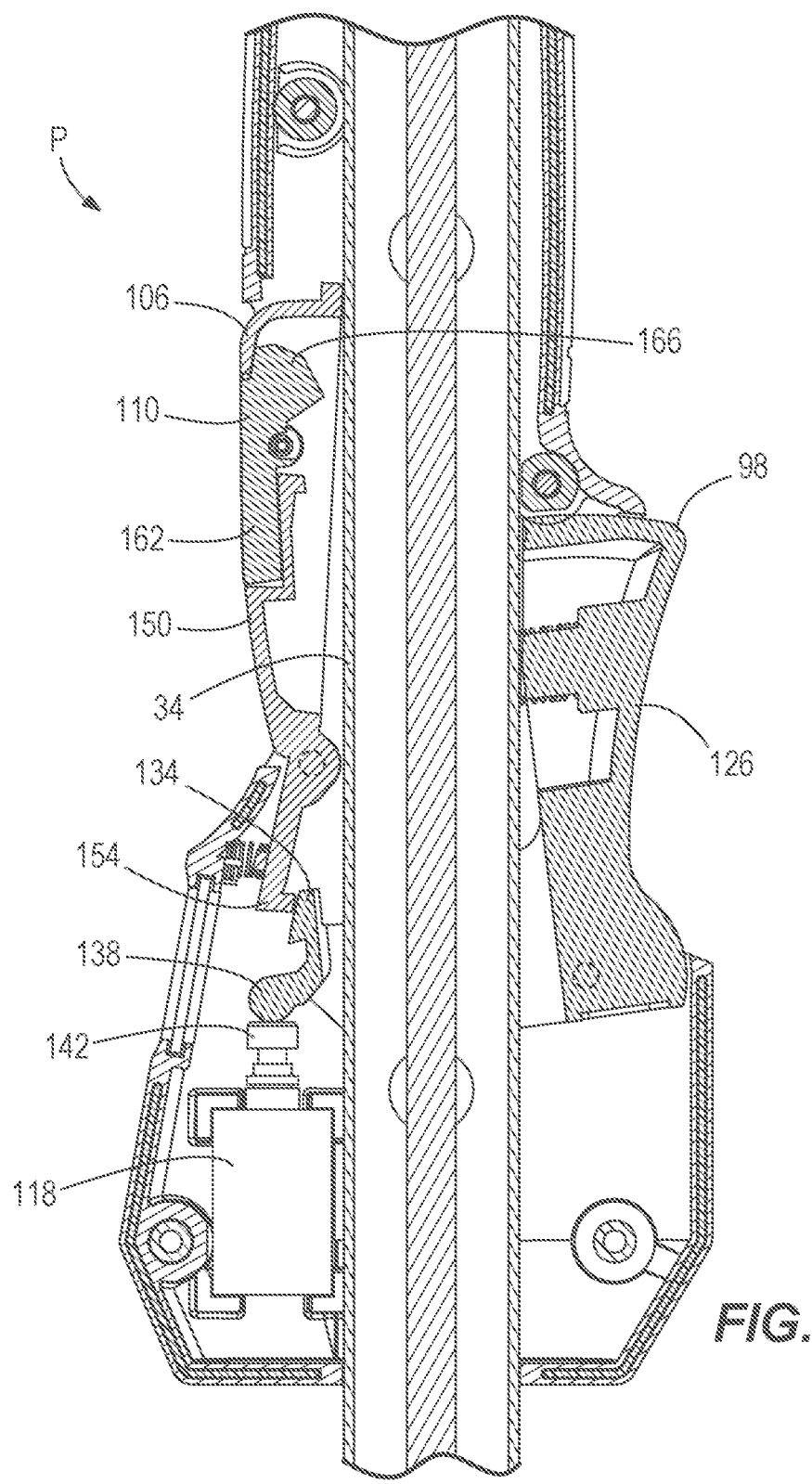
FIG. 19 is a cross-sectional view of the portion of the powerhead unit as shown in FIG. 16, illustrating another trigger element in a pivoted position.
Figure 20:
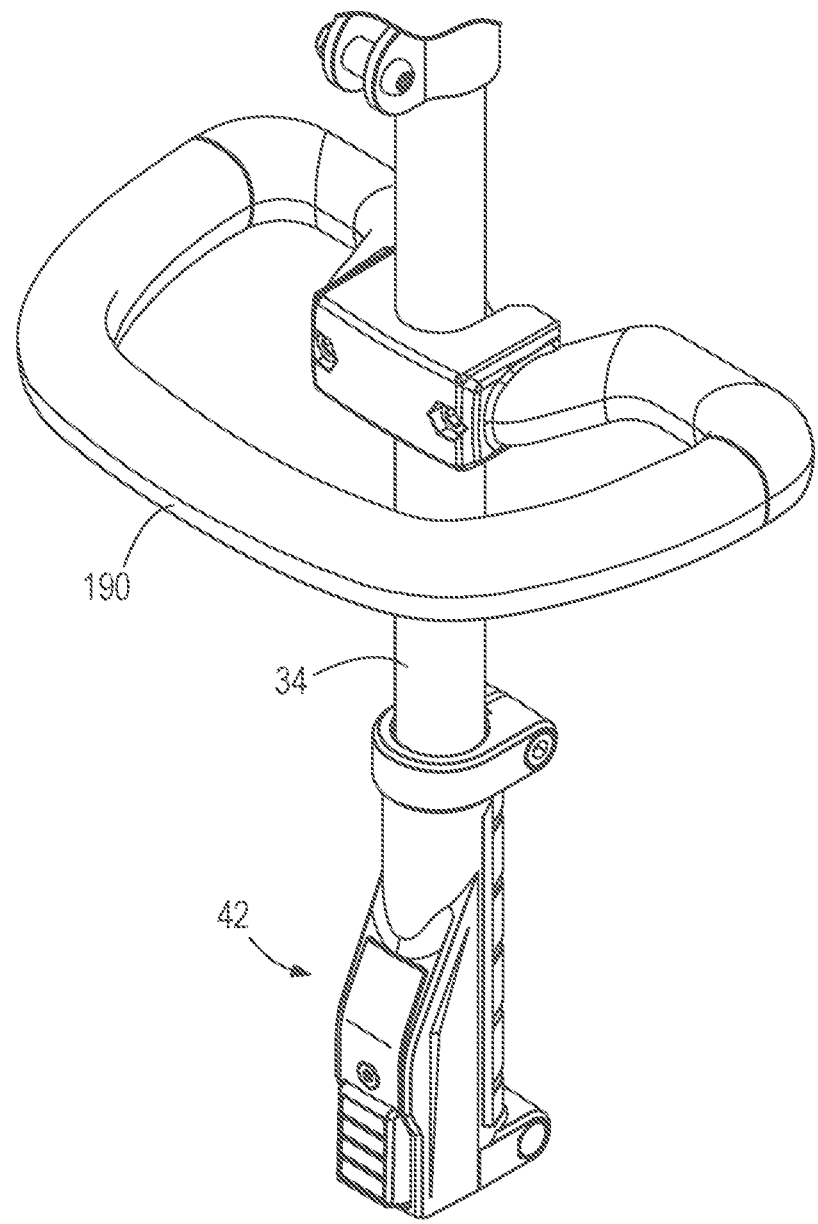
FIG. 20 is a perspective view of the shaft portion of FIG. 3.
Figure 21:
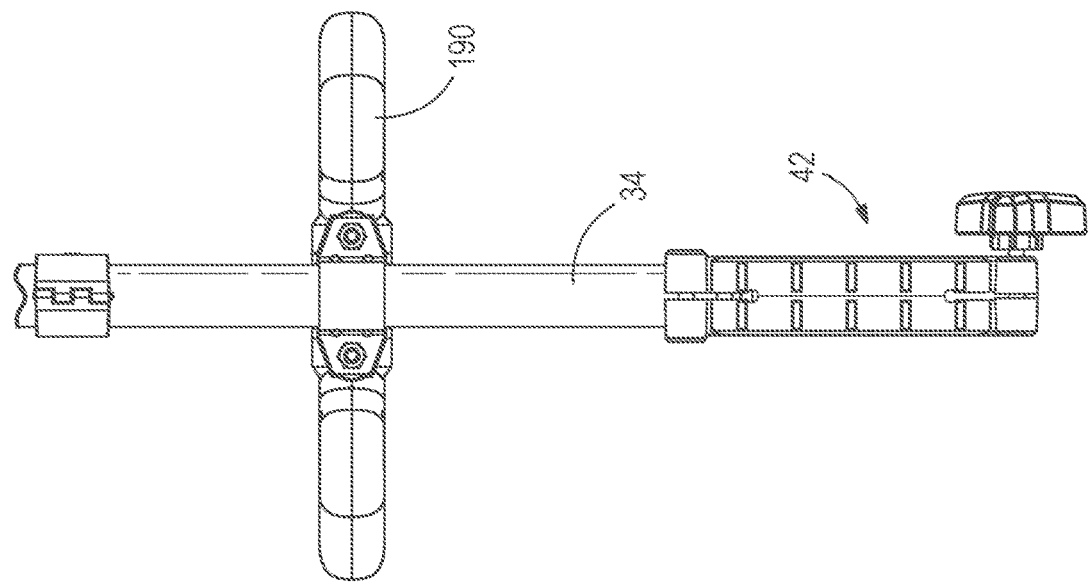
FIG. 21 is a top view of the shaft portion as shown in FIG. 20.
Figure 22:
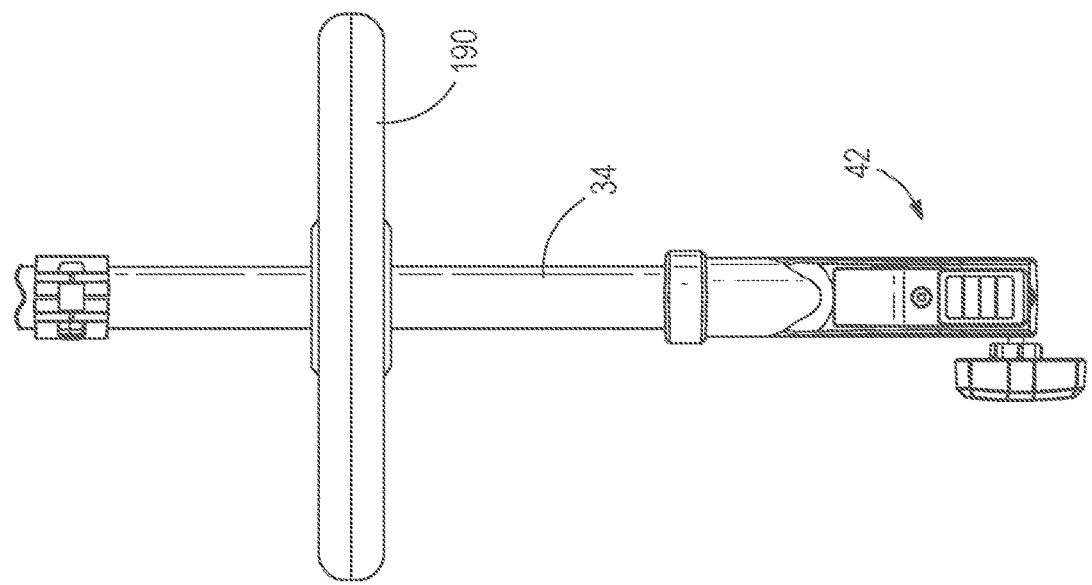
FIG. 22 is a bottom view of the shaft portion as shown in FIG. 20.
Figure 24:
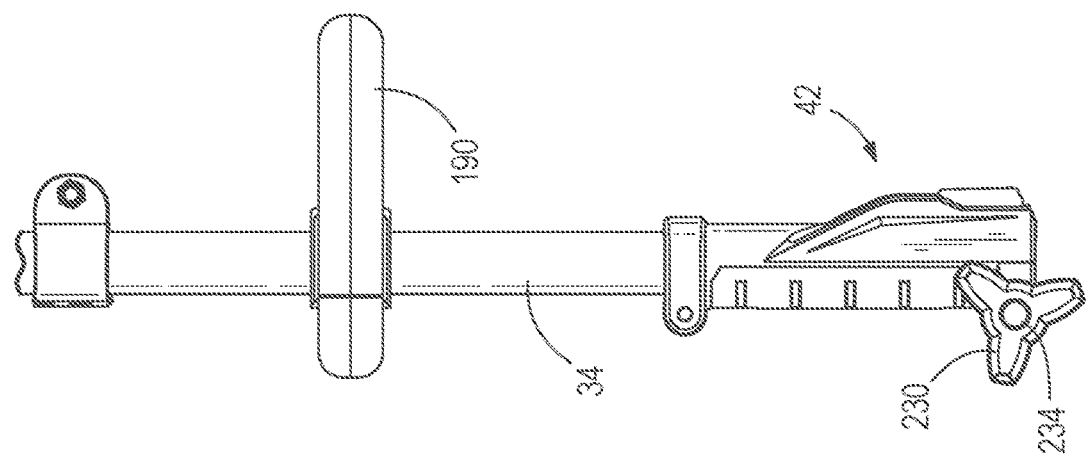
FIG. 24 is another side view of the shaft portion as shown in FIG. 20.
Figure 23:
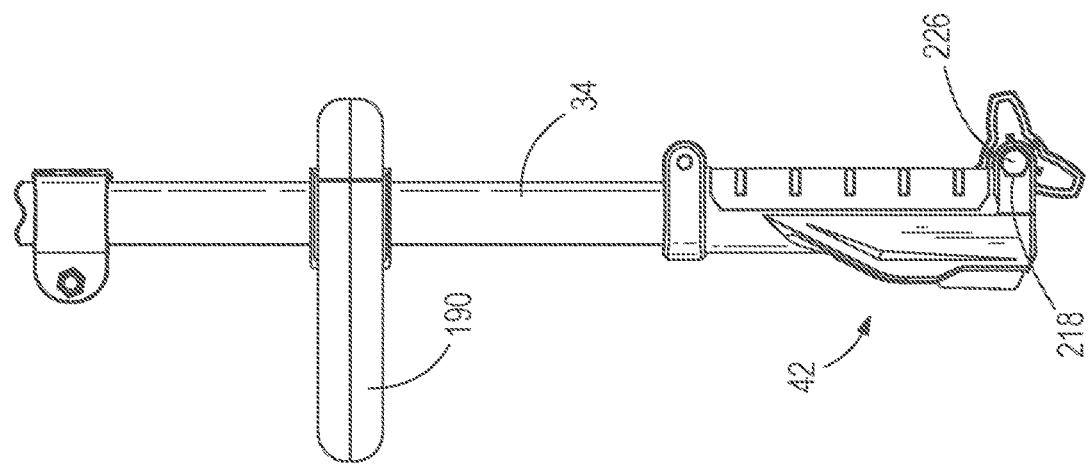
FIG. 23 is a side view of the shaft portion as shown in FIG. 20.
Figure 26:
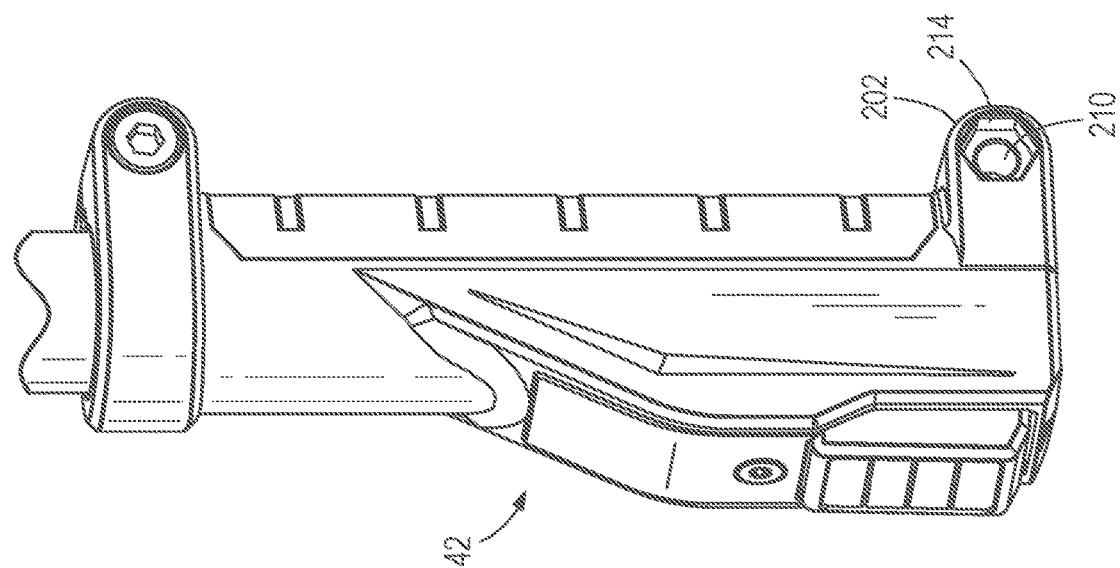
FIG. 26 is another perspective view of the connecting portion as shown in FIG. 25.
Figure 25:
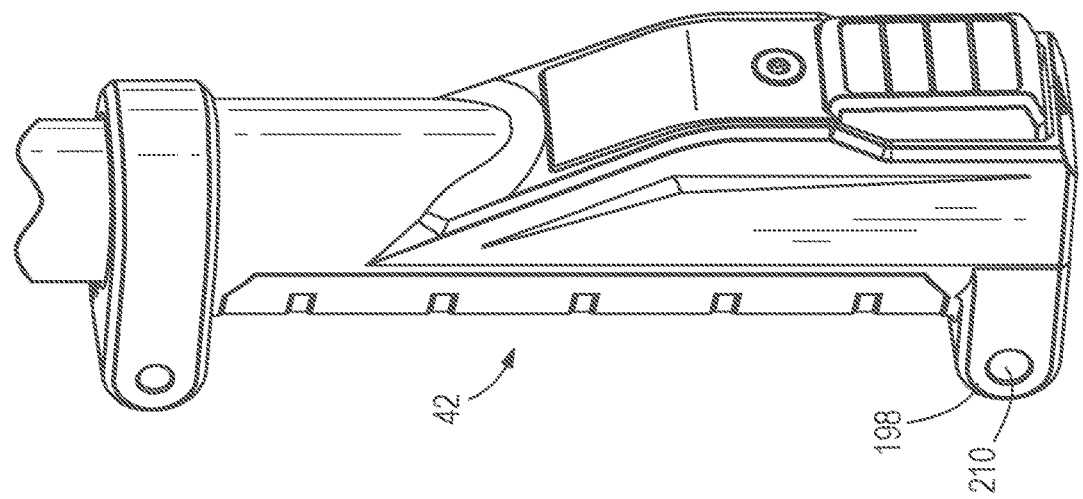
FIG. 25 is a perspective view of a connecting portion of the shaft portion as shown in FIG. 20.

To subsequently deactivate the motor 62, the trigger 98 is released, and the biasing member returns the trigger 98 to the extended position (FIG. 18). The lock-off assembly may be disengaged so that the lock-off members 106, 110 return under the biasing force to their respective initial, un-operated positions.

With reference to FIGS. 1-2D and 32-34, each attachment unit A includes an operational unit O (e.g., a string trimmer head, a hedge trimmer head, an edger head, a saw blade, etc.), a second connecting portion 174, and a second shaft segment 178 extending between the operational unit O and the second connecting portion 174. A second driveshaft segment 182 (FIG. 34) is rotatably coupled to the operational unit O and extends within the second shaft segment 178 between the operational unit O and the second connecting portion 174.

In the illustrated construction, the second driveshaft segment 182 terminates at the second connecting portion 174 in a female connection member 186 (e.g., a spline hub (FIG. 34)).

When the powerhead unit P is coupled to the attachment unit A, the spline 94 (FIG. 10) selectively engages and rotatably couples to the female connection member 186, so that rotary power is transmitted by the driveshaft segments 86, 182 from the motor 62 to the operational unit O, as discussed in greater detail below.

FIGS. 20-31 illustrate the first shaft segment 34, the first connecting portion 42, and a second handle 190 coupled to the first shaft segment 34. The first connecting portion 42 defines an envelope 192 (FIG. 27) with an axial opening 194 for receiving the second connecting portion 174 (FIGS. 32-34) of the attachment unit A. The male connection member 94 (FIG. 28) resides entirely within the opening 194 so that the envelope 192 protects the first connecting portion 42 (e.g., the male connection member 94) against damage (e.g., from dropping) when the attachment unit A is detached from the powerhead unit P.

Figure 27:
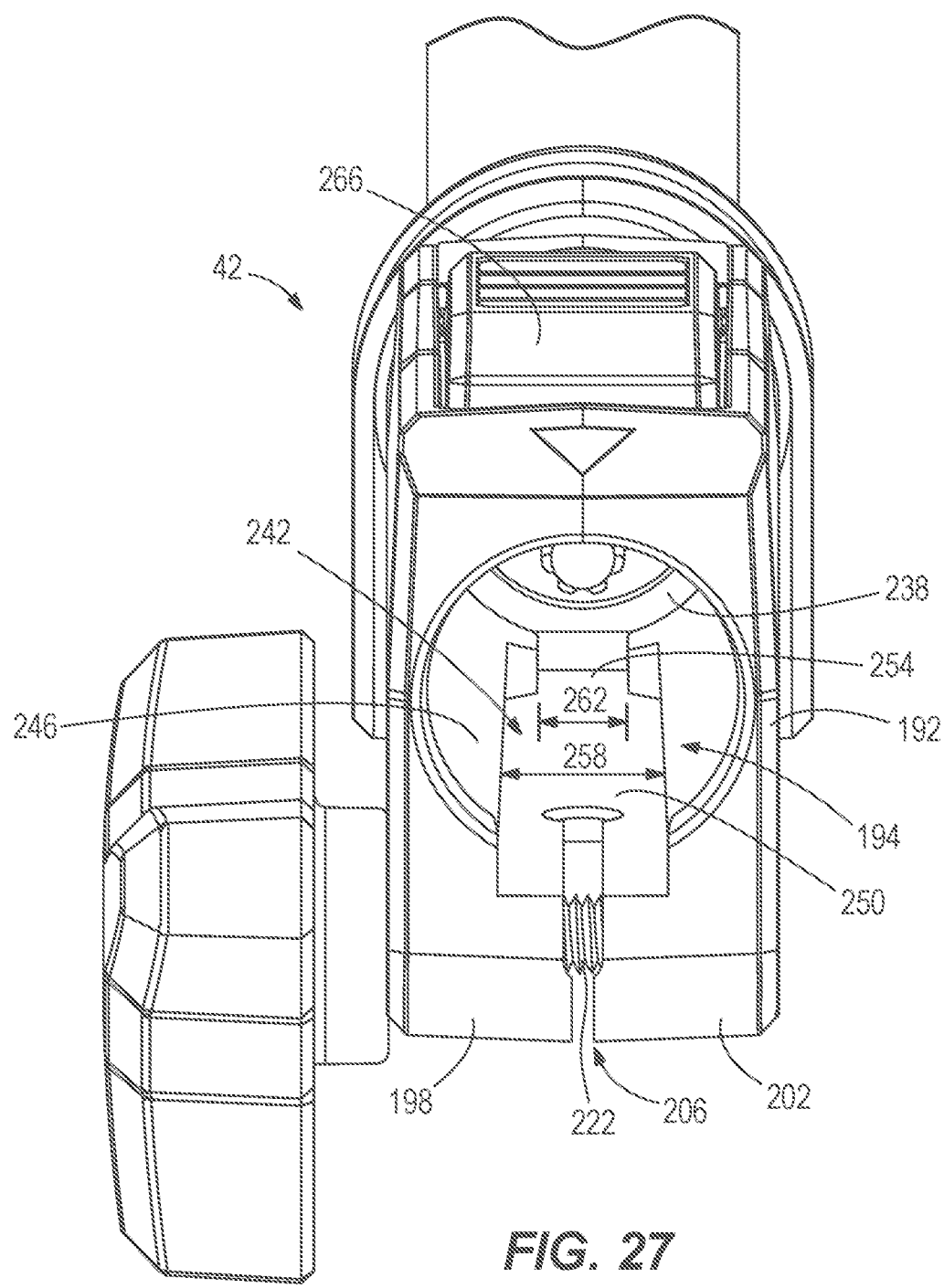
FIG. 27 is a perspective end view of the connecting portion as shown in FIG. 25.
Figure 28:
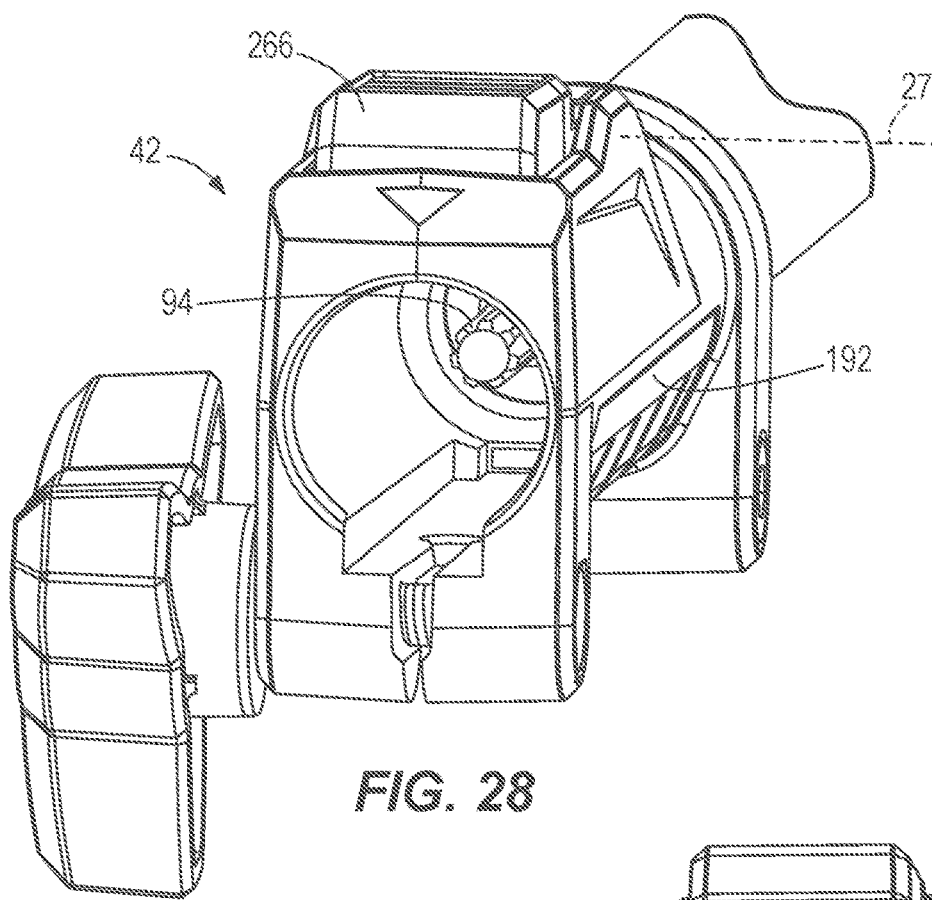
FIG. 28 is another perspective end view of the connecting portion as shown in FIG. 25.
Figure 29:
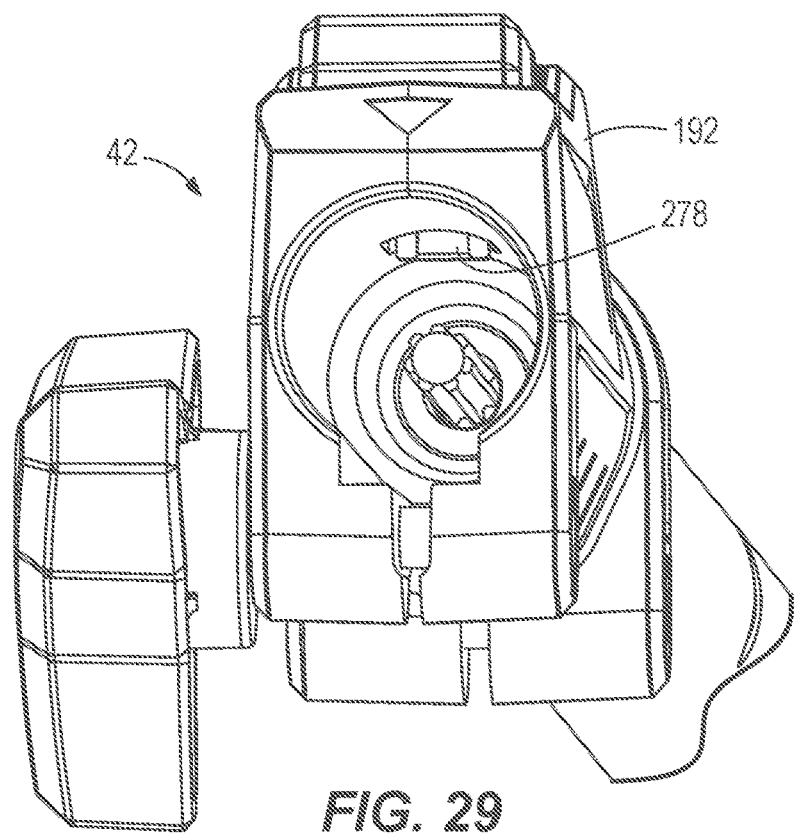
FIG. 29 is another perspective end view of the connecting portion as shown in FIG. 25.
Figure 30:
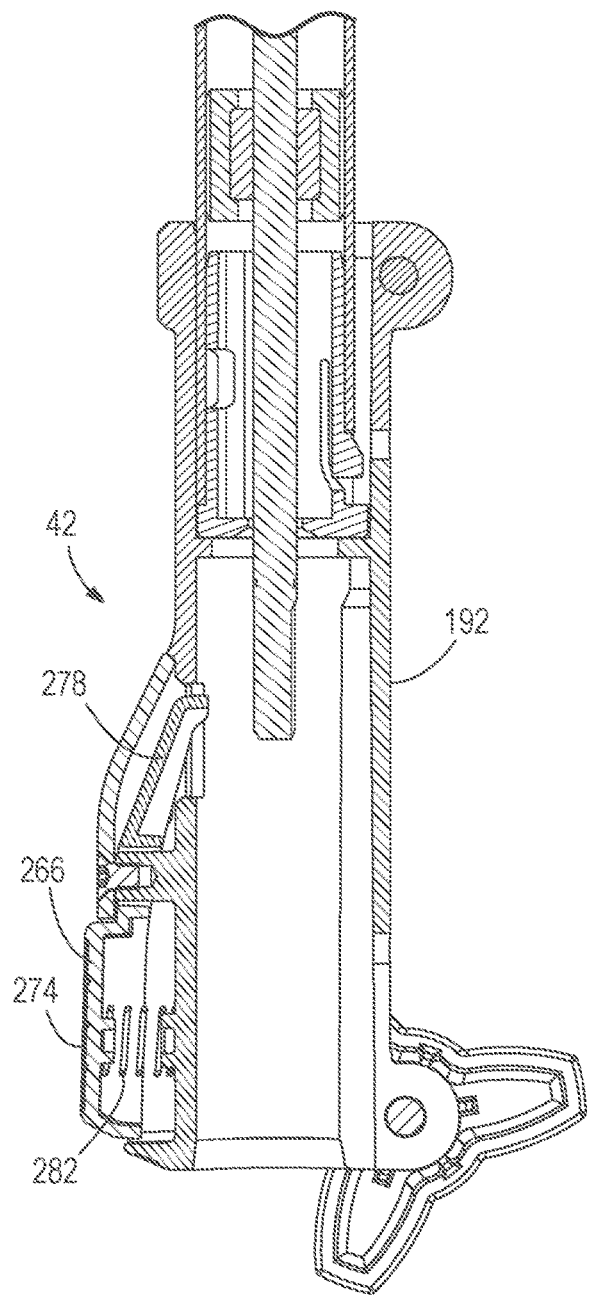
FIG. 30 is a cross-sectional side view of the connecting portion as shown in FIG. 25, taken generally along line 10-10 of FIG. 4.
Figure 31:
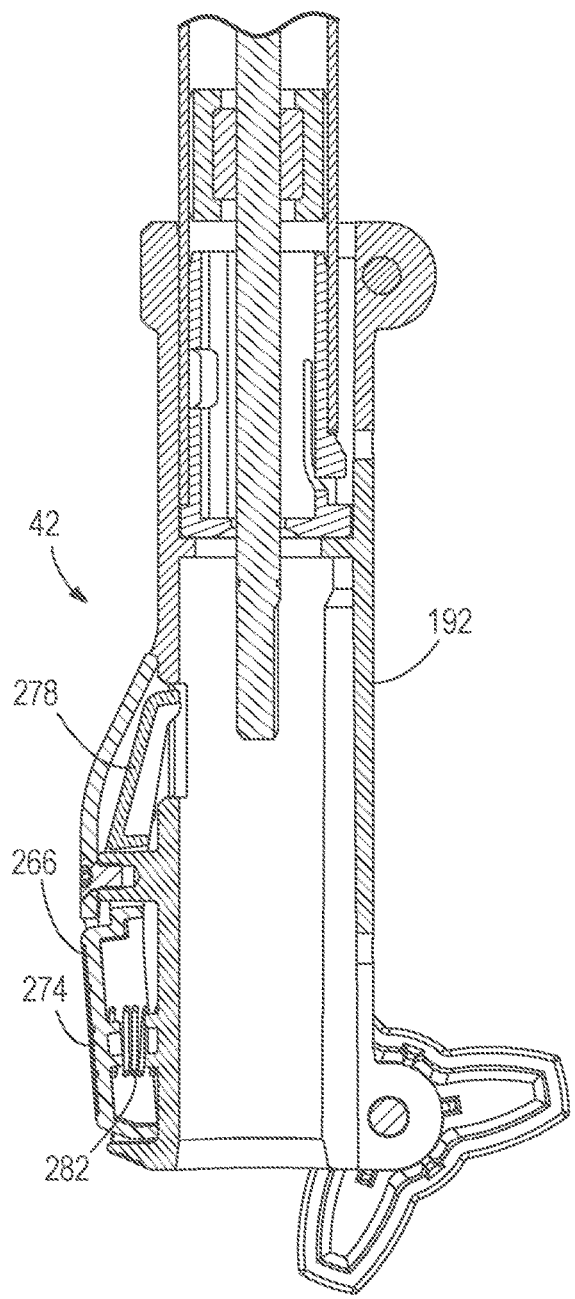
FIG. 31 is another cross-sectional view of the connecting portion as shown in FIG. 25, taken along line 10-10 of FIG. 4.

In the illustrated construction, the envelope 192 defines first and second clamping flanges 198 and 202 (FIGS. 25 and 26) that are separated by a clamping slot 206 (FIG. 27). Each clamping flange 198, 202 defines an aperture 210 (FIGS. 25 and 26), and the second clamping flange 202 further defines a recess 214 associated with the aperture 210. A clamping bolt 218 (FIG. 23) with a threaded shaft 222 (FIG. 27) and a head 226 (FIG. 23) is removably supported by the clamping flanges 198, 202 so that, when installed, the shaft 222 extends through both apertures 210 and the head 226 is rotatably fixed within the recess 214. A clamping knob 230 (FIG. 24) supports a nut 234 that threadably engages the shaft 222.

The axial opening 194 terminates in a stop surface 238 (FIG. 27). A keyway 242 extends axially along an inner surface 246 of the opening 194 adjacent the slot 206. The keyway 242 includes a first keyway portion 250 adjacent the slot 206 and a second keyway portion 254 adjacent the stop surface 238. The first keyway portion 250 has a first width 258, and the second keyway portion 254 has a second width 262, which is less than the first width 258 in the illustrated construction. The keyway portions 250, 254 allow for coarse and fine alignment between the connecting portions 42, 174, as discussed in further detail below.

The first connecting portion 42 further includes a quick-disconnect button 266 located opposite the flanges 198, 202. The button 266 is pivotable about a button axis 270 (FIG. 28) between extended and depressed positions and includes a button portion 274 (FIG. 30) protruding from the first connecting portion 42 and a hook 278 that, in the extended position, protrudes into the axial opening 194. A spring 282 (FIG. 30) engages the button portion 274 and biases the button 266 toward the extended position.

Figure 32:
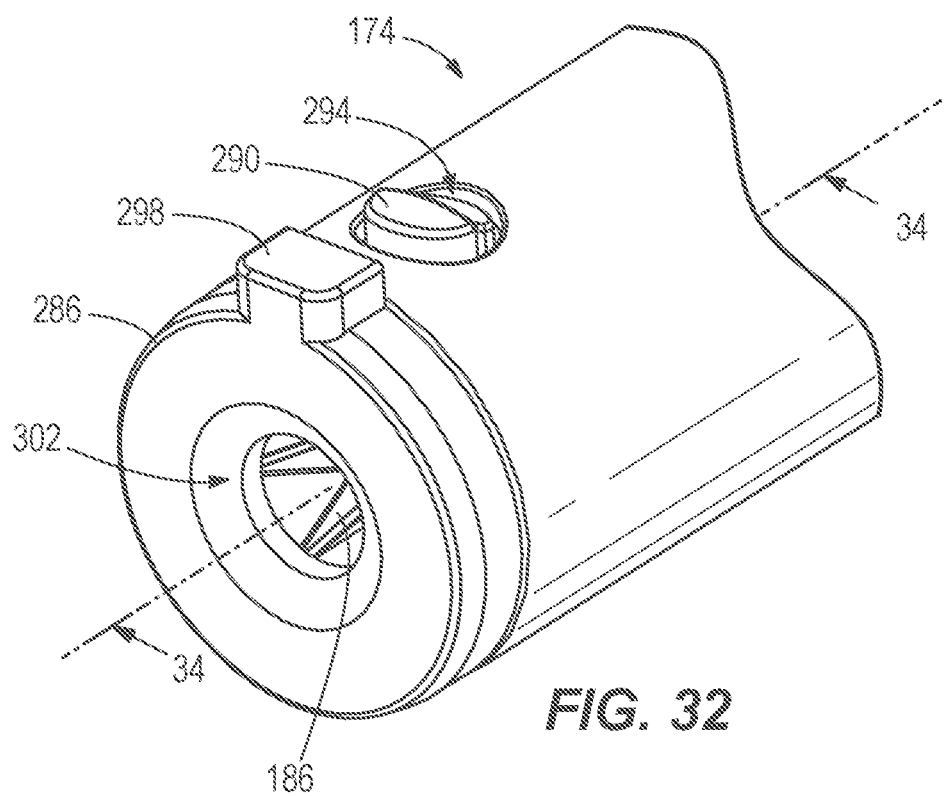
FIG. 32 is a perspective view of a connecting portion of the attachment unit of FIG. 1.
Figure 33:
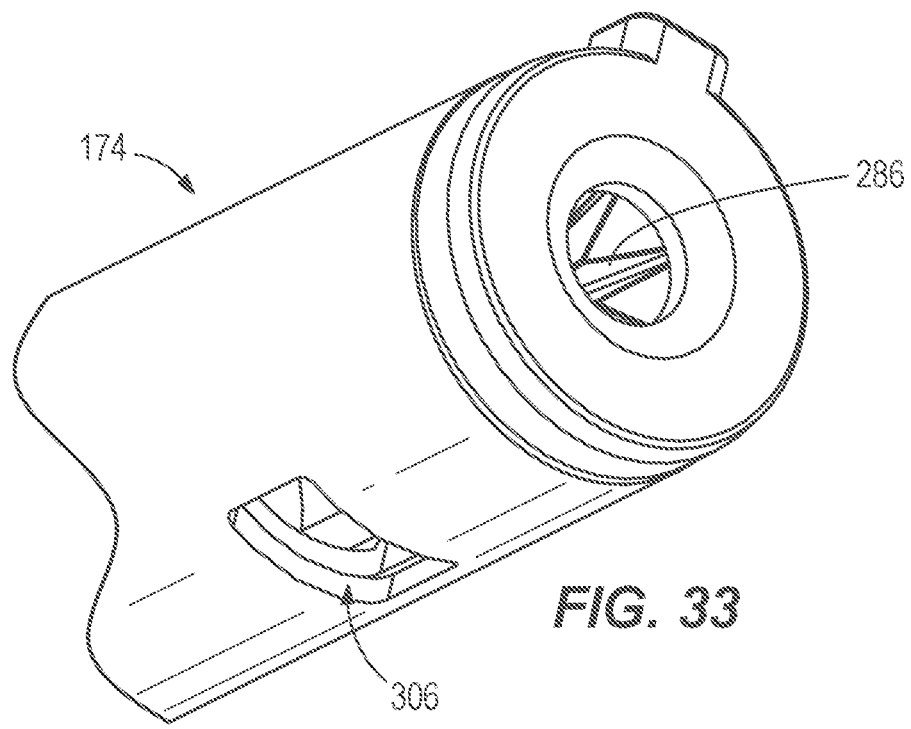
FIG. 33 is another perspective view of the connecting portion as shown in FIG. 32.
Figure 34:
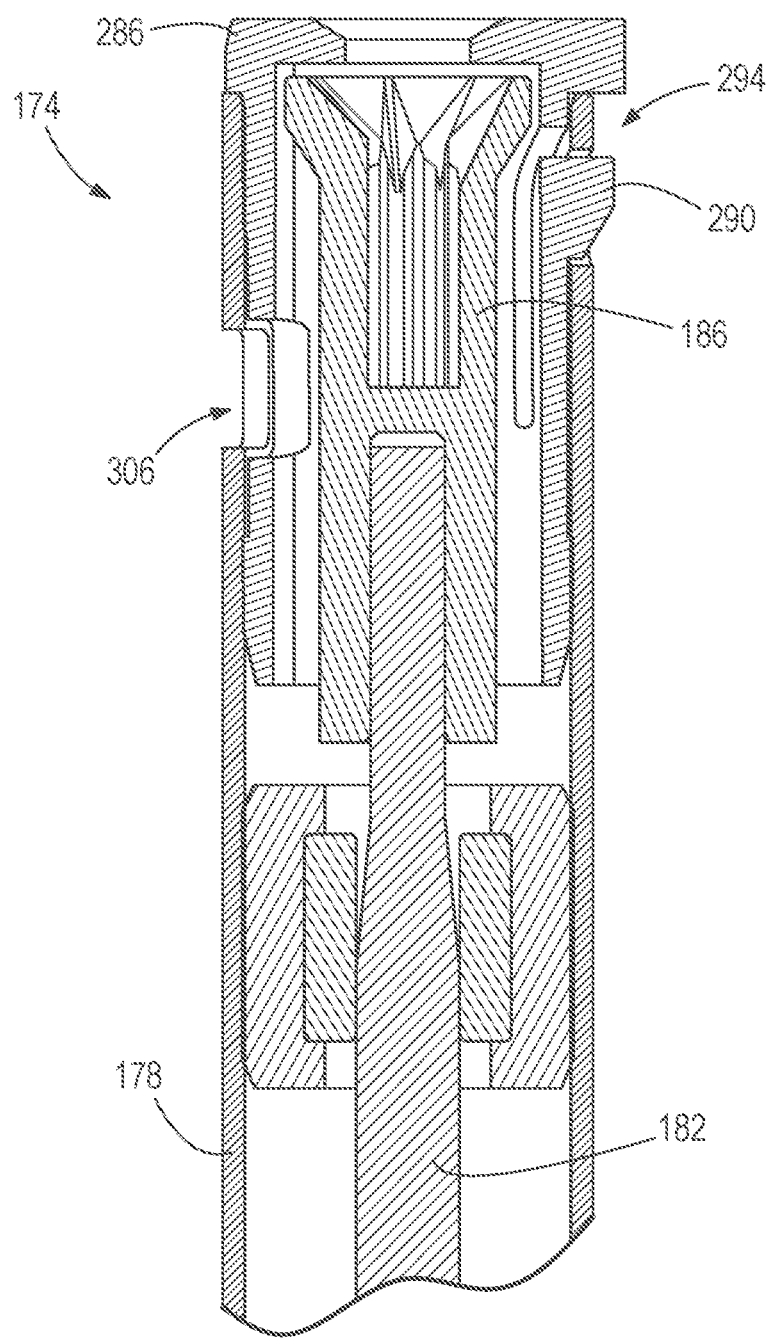
FIG. 34 is a cross-sectional view of the connecting portion of FIG. 32, taken generally along line 34-34 of FIG. 32.

With reference to FIGS. 32-34, the second connecting portion 174 includes a sleeve 286 insertable into the second shaft segment 178. The sleeve 286 is retained by a clip 290 that engages an opening 294 in the second shaft segment 178. The sleeve 286 defines a key 298 and a hub opening 302 that permits access to the female connection member 186. The second connecting portion 174 also includes a slot 306 for receiving the hook 278 of the quick-disconnect button 266 when the second connecting portion 174 is inserted into the first connecting portion 42.

Figure 35:
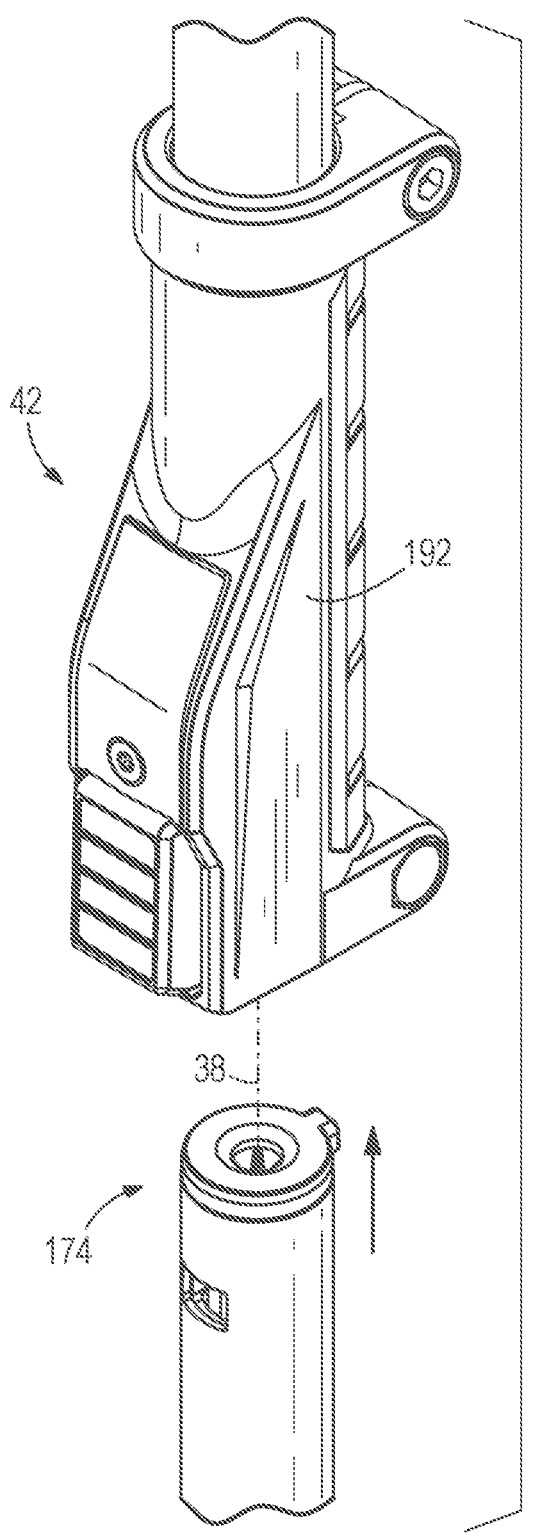
FIG. 35 is a perspective view of the connecting portion of FIG. 20 and the connecting portion of FIG. 32.
Figure 36:
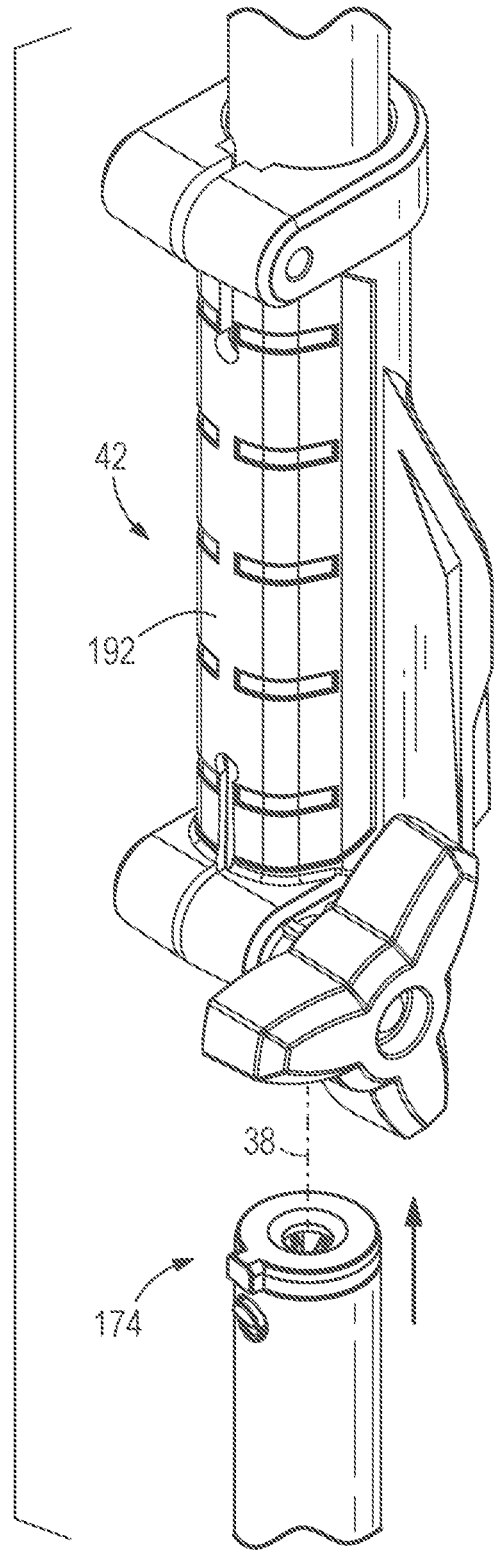
FIG. 36 is another perspective view of the connecting portion of FIG. 20 and the connecting portion of FIG. 32.
Figure 37:
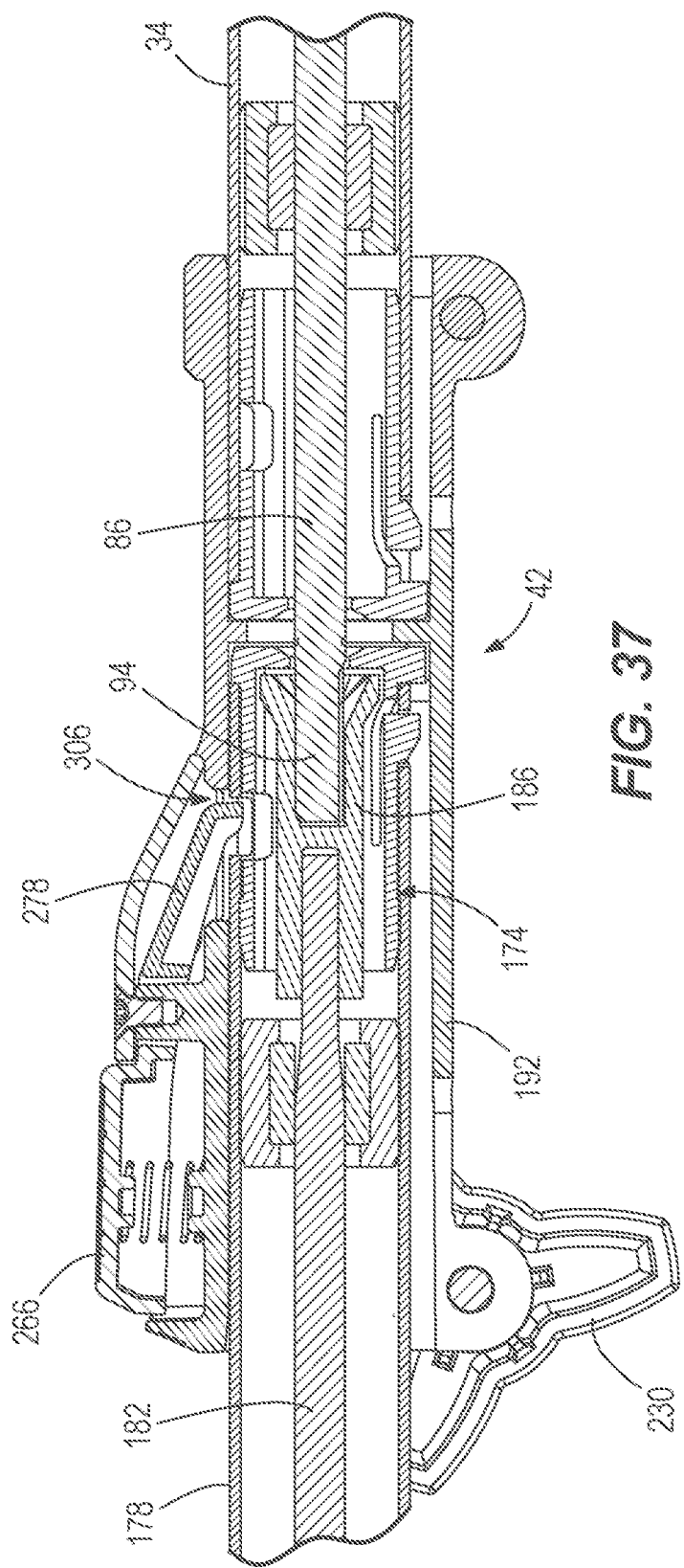
FIG. 37 is a cross-sectional side view of the connecting portion of FIG. 20 coupled to the connecting portion of FIG. 32.

To assemble the powerhead unit P to the attachment unit A (FIGS. 35-37), the second connecting portion 174 is inserted into the axial opening 194 of the first connecting portion 42 with the key 298 aligned with the keyway 242. As the second connecting portion 174 is inserted, the key 298 first enters the wider first keyway portion 250, which coarsely aligns the attachment unit A with the powerhead unit P. The male connection member 94 engages the female connection member 186 to drivingly couple the first driveshaft segment 86 to the second driveshaft segment 182. Eventually, the key 298 enters and engages the narrower second keyway portion 254, which finely aligns the attachment unit A with the powerhead unit P to ensure proper alignment for operation. The key 298 passes through the second keyway portion 254 until the sleeve 286 engages the stop surface 238.

Once the sleeve 286 has reached the stop surface 238, the hook 278 slides into the slot 306. The hook 278 prevents relative axial movement between the connecting portions 42, 174 to initially secure the attachment unit A to the powerhead unit P. The hook 278 and the slot 306 cooperate to prevent unwanted release or removal of the attachment member A until the clamping knob 230 is tightened to clamp the first connecting portion 42 to the second connecting portion 174. To quickly release, the quick-disconnect button 266 is pressed to pivot the hook 278 away from the slot 306 and free the second connecting portion 174 for axial movement away from the first connecting portion 42.

With the hook 278 engaged in the slot 306, the clamping knob 230 is rotated to tighten the nut 234 and clamp the first connecting portion 42 onto the second connecting portion 174. The clamping knob 230 permits the user to clamp the connecting portions 42, 174 together without requiring tools to do so, as well as facilitate a more secure fit between the two connecting portions 42, 174. When assembled, the connecting portions 42, 174 align the powerhead unit P and the attachment unit A along the shaft axis 38.

The process to remove the attachment unit A is opposite to installation. The clamping knob 230 is first loosened to release the clamping pressure exerted by the first connecting portion 42 on the second connecting portion 174. The button 266 is then pressed to disengage the hook 278 from the slot 306, so that the second connecting portion 174 can slide axially out of the first connecting portion 42 to release the attachment unit A.

In the illustrated construction of FIGS. 1-37, the powerhead unit P includes the first connecting portion 42 (i.e., having the male connection member 94, the envelope 192, the flanges 198 and 202, etc.), and the attachment unit A includes the second connecting portion 174 (i.e., having the female connection member 186, the sleeve 286, the key 298, etc.). In alternative constructions (not shown), the first connecting portion 42 (with the associated male connection member 94, the envelope 192, etc.) may be located on the attachment unit A, and the second connecting portion 174 (with the associated female connection member 186, the sleeve 286, etc.) may be located at the powerhead unit P.

Figure 38:
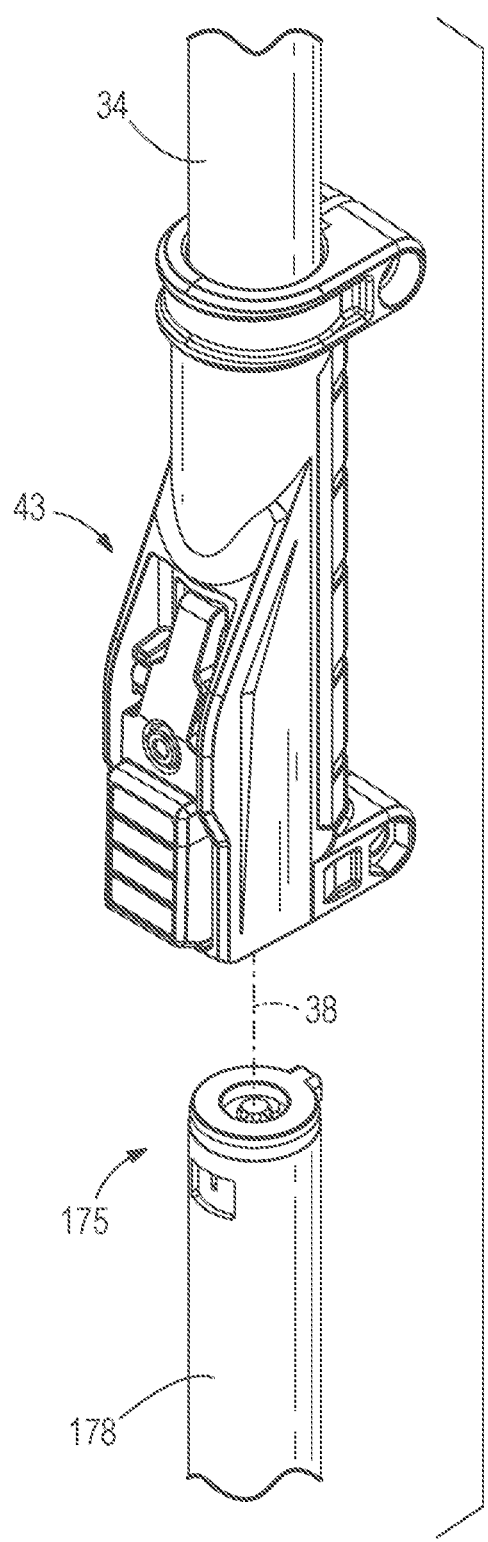
FIG. 38 is a perspective view of another connecting portion of the shaft portion as shown in FIG. 20, and another connecting portion of the attachment unit of FIG. 1.
Figure 39:
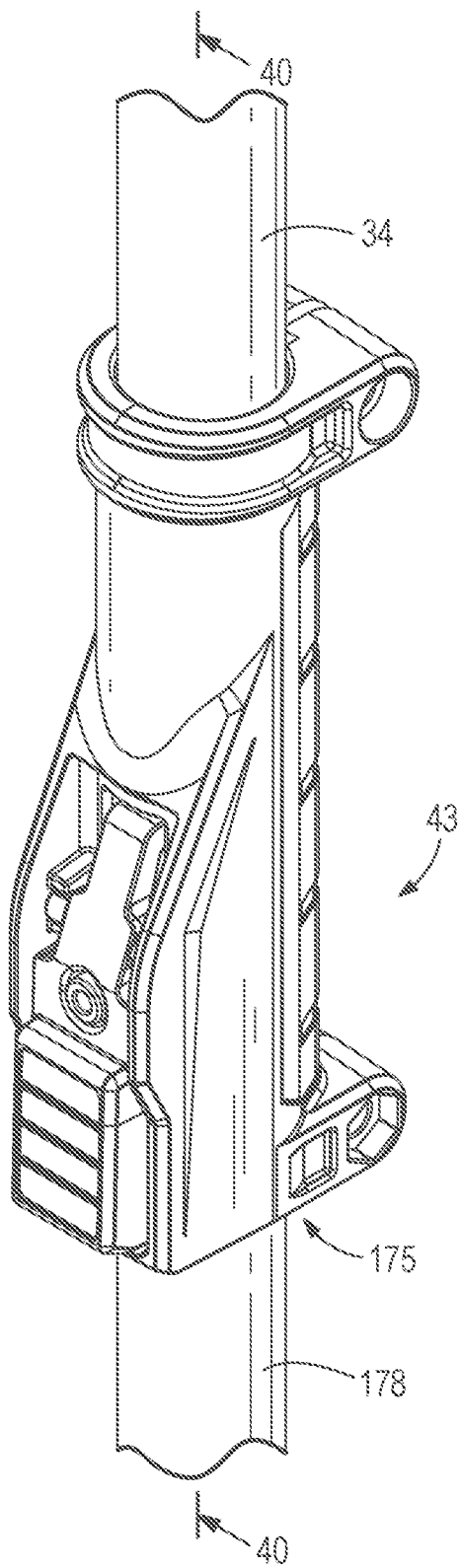
FIG. 39 is another perspective view of the connecting portions of FIG. 38.
Figure 40:
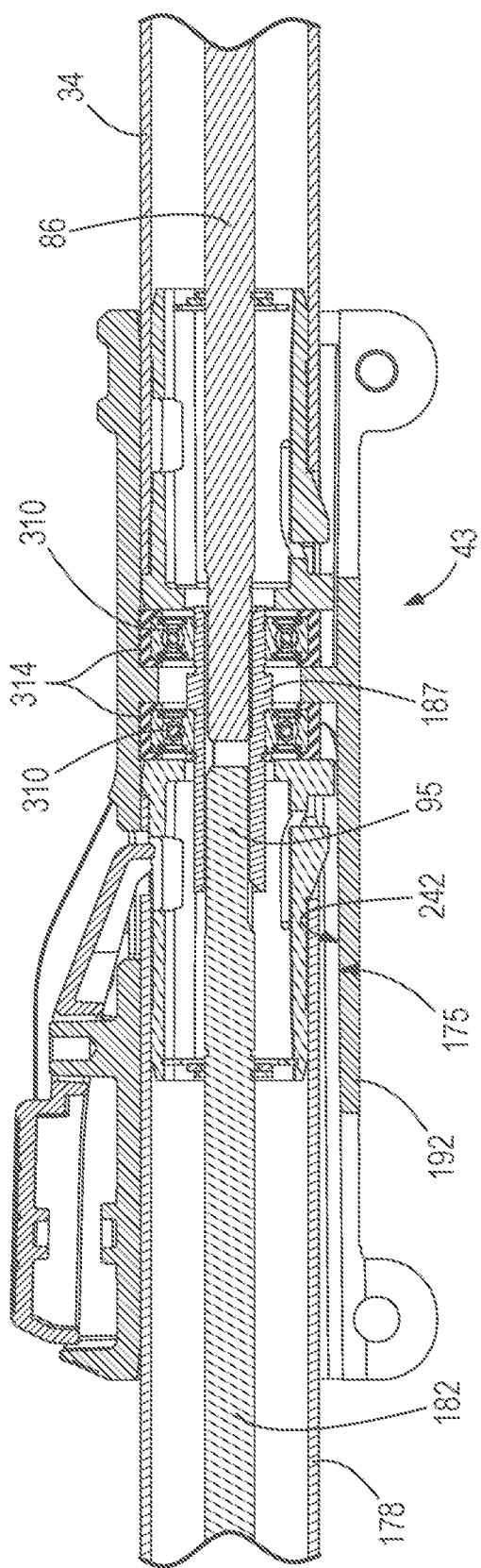
FIG. 40 is a cross-sectional side view of the connecting portions of FIG. 38 taken along line 40-40 of FIG. 39.

FIGS. 38-40 illustrate a first connecting portion 43 and a second connecting portion 175 according to another construction, which can be used in the powerhead unit P and the attachment unit A in place of the first and second connecting portions 42, 174, respectively. The first and second connecting portions 43, 175 include many of the same features that are described relative to the first and second connecting portions 42, 174. However, the first connecting portion 43 of the illustrated construction differs from the first connecting portion 42 described above in that the first connecting portion 43 includes a female connection member 187 rotatably supported within the envelope 192 by two bearings 310. Accordingly, the first driveshaft segment 86 terminates in the female connection member 187 within the first connecting portion 43. At the second connecting portion 175, the second driveshaft segment 182 terminates in a male connection member 95. When the powerhead unit P is coupled to the attachment unit A, the female connection member 187 selectively receives and rotatably couples to the male connection member 95 to transmit rotary power between the driveshaft segments 86, 182.

The first connecting portion 43 also includes a pair of elastomeric members 314 interposed between the wall of the envelope 192 and an outer race of each bearing 310, respectively. The elastomeric members 314 are formed from an elastomeric material (e.g., rubber) and vibrationally isolate the bearings 310 from the envelope 192 and from the exterior of each shaft segment 34, 178. Thus, vibrations generated by the driveshaft segments 86, 182 are prevented from passing to the envelope 192 or to the outside of the shaft segments 34, 178. The elastomeric members 314 also allow for more misalignment (i.e., greater manufacturing tolerance) of the bearings 310 during assembly of the first connecting portion 43, as compared to bearings that are press-fit directly into the envelope 192. In some constructions, the bearings 310 rotatably support and axially fix the female connection member 187 relative to the envelope 192, and the first driveshaft segment 86 is not welded to the female connection member 187. This reduces costs and eliminates any risk of the first driveshaft segment 86 bending as a result of the welding process.

Figure 41:
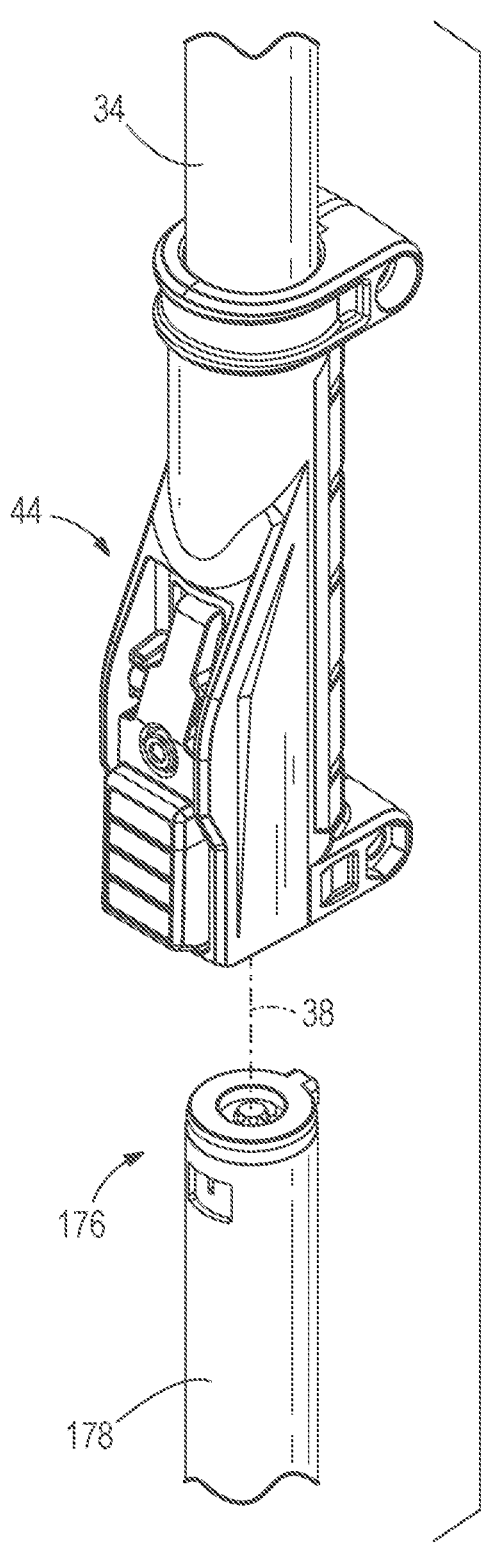
FIG. 41 is a perspective view of another connecting portion of the shaft portion as shown in FIG. 20, and another connecting portion of the attachment unit of FIG. 1.
Figure 42:
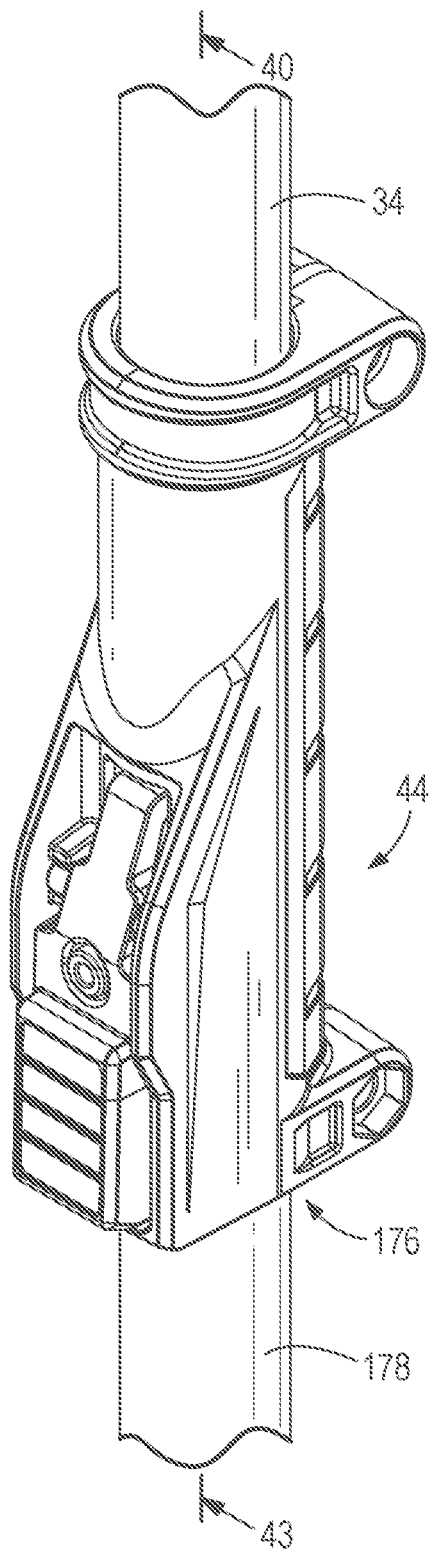
FIG. 42 is another perspective view of the connecting portions of FIG. 41.
Figure 43:
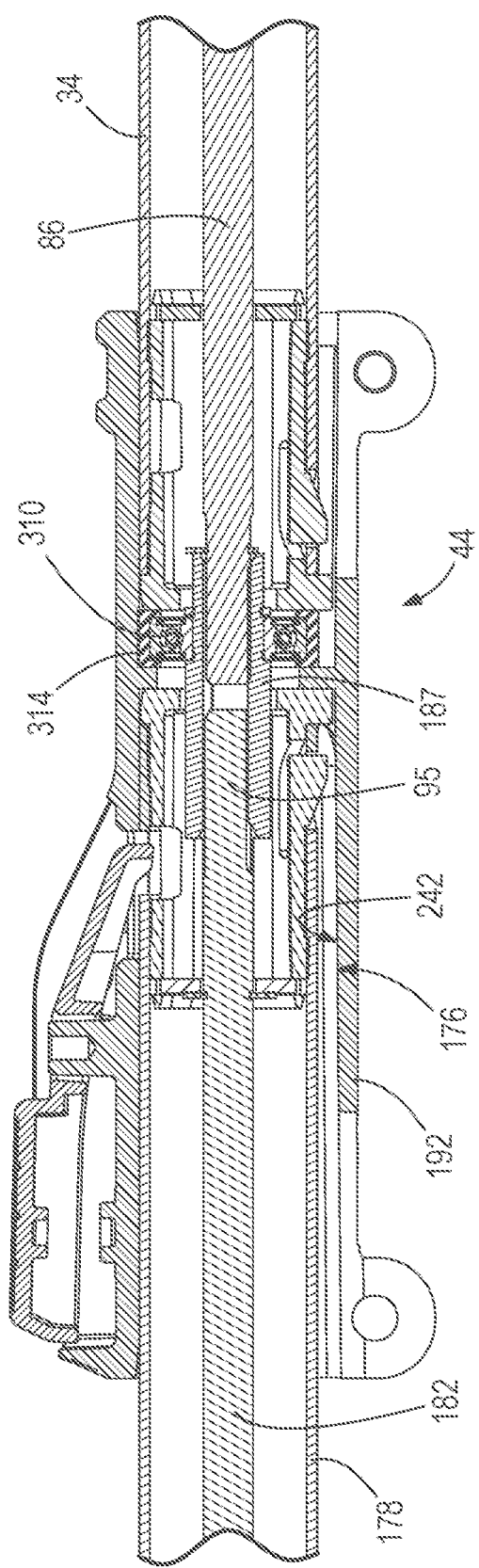
FIG. 43 is a cross-sectional side view of the connecting portions of FIG. 41 taken along line 43-43 of FIG. 42

FIGS. 41-43 illustrate a first connecting portion 44 and a second connecting portion 176 according to another construction, which can be used in the powerhead unit P and the attachment unit A in place of the first connecting portions 42, 43, and second connecting portions 174, 175, respectively. The first and second connecting portions 44, 176 include the same features that are described relative to the first and second connecting portions 43, 175, but includes just a single bearing 310 rotatably supporting the female connection member 187 within the envelope 192. A single elastomeric member 314 surrounds the bearing 310 and is interposed between the wall of the envelope 192 and an outer race of the bearing 310. The elastomeric member 314 vibrationally isolates the bearing 310 from the envelope 192 and from the exterior of each shaft segment 34, 178. Thus, vibrations generated by the driveshaft segments 86, 182 are prevented from passing to the envelope 192 or to the outside of the shaft segments 34, 178. The elastomeric member 314 also allows for more misalignment (i.e., greater manufacturing tolerance) of the bearing 310 during assembly of the first connecting portion 44, as compared to a bearing that is press-fit directly into the envelope 192. In some constructions, the bearing 310 rotatably supports and axially fixes the female connection member 187 relative to the envelope 192, and the first driveshaft segment 86 is not welded to the female connection member 187. This reduces costs and eliminates any risk of the first driveshaft segment 86 bending as a result of the welding process.

Figure 44:
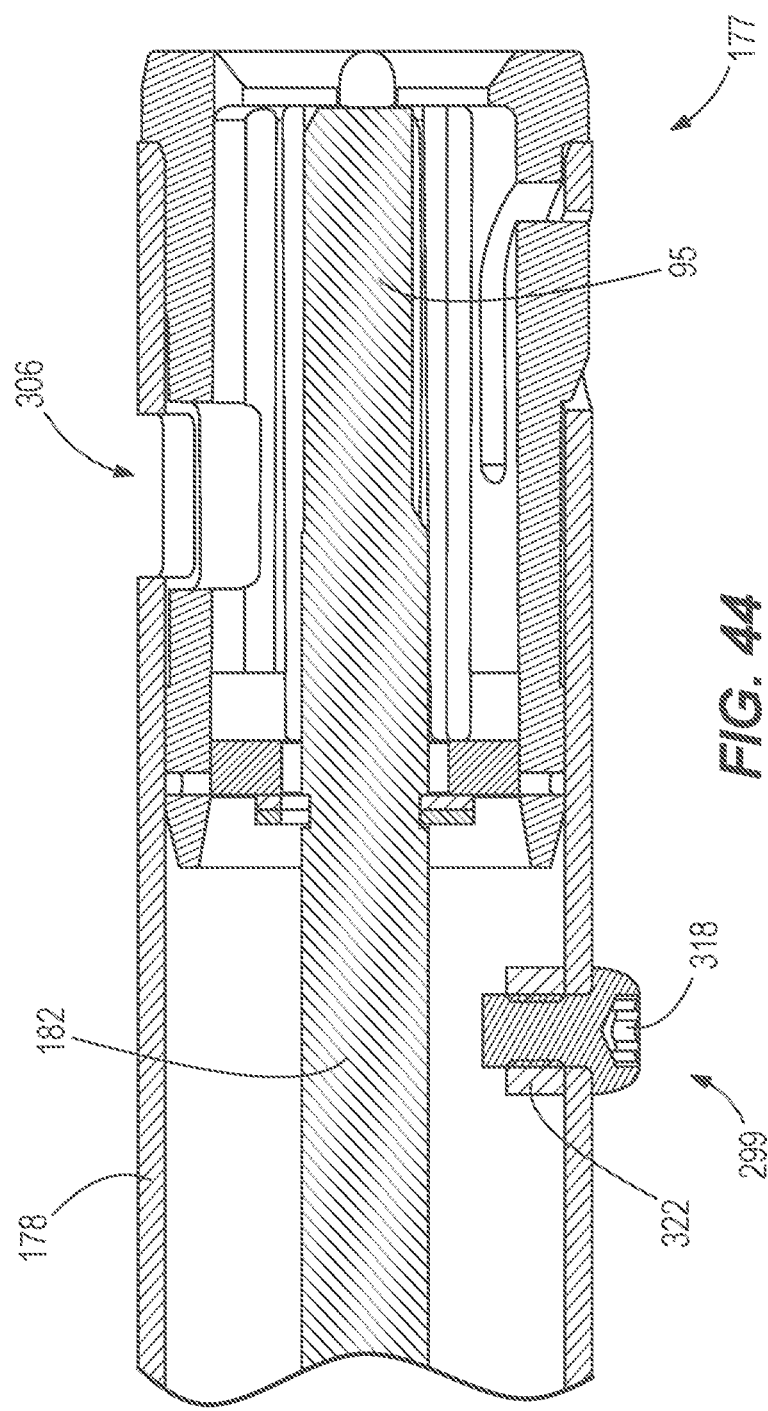
FIG. 44 is a cross-sectional side view of another connecting portion of the attachment unit of FIG. 1.

FIG. 44 illustrates a second connecting portion 177 according to another construction, which can be used in the attachment unit A in place of the second connecting portions 175, 176. The second connecting portion 177 includes the same features that are described relative to the second connecting portions 175, 176, but includes an alternative key 299 defined by a screw 318 supported by the shaft segment 178 and secured thereto by a nut 322. The second connecting portion 177 is inserted into the first connecting portion 43 (FIG. 40) or the first connecting portion 44 (FIG. 43) with the key 299 aligned with the keyway 242. Engagement between the key 299 and the keyway 242 ensures that the hook 278 aligns with and slides into the slot 306 to initially secure the attachment unit A to the powerhead unit P.

One or more independent features and/or independent advantages of the invention may be set forth in the claims.

What is claimed is:

1. An outdoor tool comprising:
    a powerhead unit including
        a motor,
        a housing assembly housing the motor and including a handle portion,
        a first shaft segment supported within the housing assembly and extending along a shaft axis to a first connecting portion,
        a first driveshaft segment coupled to the motor and extending within the first shaft segment,
        a switch supported within the handle portion and operable to activate the motor, and
        a trigger assembly including
            a trigger configured to selectively actuate the switch,
            a first lock-off member movable between a first position preventing the trigger from actuating the switch, and a second position permitting the trigger to actuate the switch, and
            a second lock-off member movable between a locked position preventing the first lock-off member from moving to the second position, and an unlocked position permitting the first lock-off member to move to the second position; and
    an attachment unit selectively couplable to and powered by the powerhead unit, the attachment unit including
        an operational unit configured to be driven by the motor,
        a second shaft segment having a second driveshaft segment operatively coupled to the operational unit, and
        a second connecting portion attached to the second shaft segment, the second connecting portion configured for coupling to the first connecting portion.

2. The outdoor tool of claim 1, wherein the second lock-off member is supported on the first lock-off member.

3. The outdoor tool of claim 1, wherein when the second lock-off member is in the locked position, contact between the second lock-off member and the first shaft segment prevents the first lock-off member from moving to the second position.

4. The outdoor tool of claim 1, wherein the second lock-off member disengages from the first shaft segment in response to being moved to the unlocked position.

5. The outdoor tool of claim 1, wherein the trigger includes an actuating portion, and wherein the first driveshaft segment extends between the actuating portion and the first lock-off member.

6. The outdoor tool of claim 5, wherein the trigger further includes an arm portion partially extending around the first shaft segment, wherein the arm portion defines a first hook portion, and wherein the first lock-off member defines a second hook portion that is selectively engageable with the first hook portion to prevent the trigger from actuating the switch.

7. The outdoor tool of claim 6, wherein the switch includes a plunger, and wherein the arm portion is configured to selectively actuate the plunger.

8. The outdoor tool of claim 1, wherein the trigger is pivotable about a trigger axis, the first lock-off member is pivotable about a first member axis, and the second lock-off member is pivotable about a second member axis, and wherein the trigger axis, the first member axis, and the second member axis are each parallel to one another.

9. A powerhead unit for an outdoor tool, the outdoor tool further including an attachment unit selectively engageable with the powerhead unit and having an operational unit configured to be driven by the powerhead unit, the powerhead unit comprising:
    a motor;
    a housing assembly housing the motor and including a handle portion;
    a first shaft segment supported within the housing assembly and extending along a shaft axis to a first connecting portion;
    a first driveshaft segment coupled to the motor and extending within the first shaft segment;
    a switch supported within the handle portion and operable to activate the motor; and
    a trigger assembly including
        a trigger configured to selectively actuate the switch,
        a first lock-off member movable between a first position preventing the trigger from actuating the switch, and a second position permitting the trigger to actuate the switch, and a second lock-off member movable between a locked position preventing the first lock-off member from moving to the second position, and an unlocked position permitting the first lock-off member to move to the second position.

10. The powerhead unit of claim 9, wherein the housing assembly includes a battery attachment portion configured to selectively connect to a battery pack.

11. The powerhead unit of claim 9, wherein the second lock-off member is supported on the first lock-off member.

12. The powerhead unit of claim 9, wherein when the second lock-off member is in the locked position, contact between the second lock-off member and the first shaft segment prevents the first lock-off member from moving to the second position.

13. The outdoor tool of claim 9, wherein the trigger further includes an arm portion partially extending around the first shaft segment, wherein the arm portion defines a first hook portion, and wherein the first lock-off member defines a second hook portion that is selectively engageable with the first hook portion to prevent the trigger from actuating the switch.

14. The outdoor tool of claim 13, wherein the switch includes a plunger, and wherein the arm portion is configured to selectively actuate the plunger.

15. An outdoor tool comprising:
a powerhead unit including
a housing assembly including a handle portion and a battery attachment portion configured to selectively connect to a battery pack,
a first shaft segment supported within the housing assembly and extending along a shaft axis to a first connecting portion,
a switch supported within the handle portion, and
a trigger assembly including
a trigger configured to selectively actuate the switch,
a first lock-off member movable between a first position preventing the trigger from actuating the switch, and a second position permitting the trigger to actuate the switch, and
a second lock-off member supported on the first lock-off member, the second lock-off member being movable between a locked position preventing the first lock-off member from moving to the second position, and an unlocked position permitting the first lock-off member to move to the second position; and
an attachment unit selectively couplable to and powered by the powerhead unit, the attachment unit including
a second shaft segment,
an operational unit coupled to a first end of the second shaft segment, and
a second connecting portion coupled to a second end of the second shaft segment, the second connecting portion configured for coupling to the first connecting portion.

16. The outdoor tool of claim 15, wherein when the second lock-off member is in the locked position, contact between the second lock-off member and the first shaft segment prevents the first lock-off member from moving to the second position.

17. The outdoor tool of claim 16, wherein when the second lock-off member is in the locked position, contact between the second lock-off member and the first shaft segment prevents the first lock-off member from moving to the second position.

18. The outdoor tool of claim 15, wherein the trigger includes an arm portion partially extending around the first shaft segment, wherein the arm portion defines a first hook portion, and wherein the first lock-off member defines a second hook portion that is selectively engageable with the first hook portion to prevent the trigger from actuating the switch.

19. The outdoor tool of claim 18, wherein the switch includes a plunger, and wherein the arm portion is configured to selectively actuate the plunger.

20. The outdoor tool of claim 15, wherein the trigger is pivotable about a trigger axis, the first lock-off member is pivotable about a first member axis, and the second lock-off member is pivotable about a second member axis, and wherein the trigger axis, the first member axis, and the second member axis are each parallel to one another.

* * * * *